(12) United States Patent
Sivaraman et al.

(10) Patent No.: US 11,418,420 B2
(45) Date of Patent: Aug. 16, 2022

(54) PROCESS AND APPARATUS FOR IDENTIFYING AND CLASSIFYING VIDEO-DATA

(71) Applicant: NewSouth Innovations Pty Limited, Sydney (AU)

(72) Inventors: Vijay Sivaraman, Riverview (AU); Hassan Habibi Gharakheili, Hillsdale (AU); Yu Wang, Rhodes (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 118 days.

(21) Appl. No.: 16/650,972

(22) PCT Filed: Sep. 21, 2018

(86) PCT No.: PCT/AU2018/051036
§ 371 (c)(1),
(2) Date: Mar. 26, 2020

(87) PCT Pub. No.: WO2019/060949
PCT Pub. Date: Apr. 4, 2019

(65) Prior Publication Data
US 2020/0259731 A1    Aug. 13, 2020

(30) Foreign Application Priority Data
Sep. 27, 2017  (AU) ................. 2017903915

(51) Int. Cl.
*G06F 15/173* (2006.01)
*H04L 43/0829* (2022.01)
(Continued)

(52) U.S. Cl.
CPC ........ *H04L 43/0829* (2013.01); *H04L 43/045* (2013.01); *H04L 43/067* (2013.01); *H04L 43/0817* (2013.01); *H04L 47/2441* (2013.01)

(58) Field of Classification Search
CPC .. H04L 47/2441; H04L 43/067; H04L 43/045
(Continued)

(56) References Cited

U.S. PATENT DOCUMENTS

| 2015/0071072 A1* | 3/2015 | Ratzin ..................... G06F 9/544 370/235 |
| 2016/0105364 A1 | 4/2016 | Kanonakis et al. |

(Continued)

OTHER PUBLICATIONS

Zhang, H. et al., 'A Survey on Security-Aware Measurement in SDN', Review Article, Hindawi Security and Communication Networks, vol. 2018, Article ID 2459154, 14 pages, Published Apr. 24, 2018, [retrieved from internet on Nov. 28, 2018] URL: https://www.hindawi.com/journals/scn/2018/2459154/ Whole document.
(Continued)

*Primary Examiner* — Lan Dai T Truong
(74) *Attorney, Agent, or Firm* — Tarolli, Sundheim, Covell & Tummino LLP

(57) ABSTRACT

A network traffic monitoring process of a communications network including: receiving data packets from a software-defined networking (SDN) flow switch; processing header of the received packets to identify its subsets belonging to respective network flows; detecting large network flows by determining a corresponding cumulative amount of data contained in the received packets for each of the network flow until it reaches or exceeds a predetermined threshold amount of data; for each detected large network flow, sending flow identification data to the SDN flow switch to identify further packets of the large network flow and to stop sending them to the network traffic monitoring component; periodically receiving from the SDN flow switch and processing the corresponding counter data and corresponding timestamp data to generate temporal metrics of the large network flow; and processing the generated temporal met-
(Continued)

rics with a trained classifier to classify the large network flow.

10 Claims, 25 Drawing Sheets

(51) Int. Cl.
*H04L 43/045* (2022.01)
*H04L 43/067* (2022.01)
*H04L 43/0817* (2022.01)
*H04L 47/2441* (2022.01)

(58) Field of Classification Search
USPC .................... 709/224, 231, 232, 234, 236
See application file for complete search history.

(56) References Cited

U.S. PATENT DOCUMENTS

2016/0149788 A1 5/2016 Zhang et al.
2016/0330111 A1 11/2016 Manghirmalani et al.
2017/0149640 A1* 5/2017 Narayanan ............ H04L 43/062
2020/0067851 A1* 2/2020 Yigit ................... H04L 43/0876

OTHER PUBLICATIONS

Macdavid, R. et al., 'Concise Encoding of Flow Attributes in SDN Switches', Proceeding SOSR '17 Proceedings of the Symposium on SDN Research. pp. 48-60, Santa Clara, CA, USA—Apr. 3-4, 2017, ACM New York, NY, USA © 2017, [retrieved from internet on Nov. 28, 2018] URL https://dl.acm.org/citation.cfm?id=3050227 Whole document.

European Search Report for Application No. 18860240.3-1216/ 3688944 PCT/AU2018051636 dated Apr. 29, 2021.

Uddin Mostafa et al: "TrafficVision: A Case for Pushing Software Defined Networks to Wireless Edges", 2016 IEEE 13th International Conference on Mobile Ad Hoc and Sensor Systems (MASS), IEEE, Oct. 10, 2016 (Oct. 10, 2016), pp. 37-46, XP033042640, DOI: 10.1109/MASS.2016.016 [retrieved on Jan. 11, 2017] * Abstract, Sections I-V *.

* cited by examiner

Recent Flows

| Tag | Server IP | Client IP | Total Bytes (MB) | Estimated Rate (Mbps) | Quality | Duration (s) |
|---|---|---|---|---|---|---|
| netflix | 138.44.10.30 | 129.94.5.80 | 9.21 | 1.04 | Medium | 136 |
| youtube | 203.5.76.207 | 129.94.5.111 | 5.58 | 0.15 | Low | 228 |
| netflix | 138.44.10.30 | 129.94.5.84 | 219.58 | 7.69 | High | 259 |
| youtube | 203.5.76.206 | 129.94.5.80 | 910.10 | 17.00 | Ultra-high | 431 |
| facebook | 157.240.8.23 | 129.94.5.80 | 131.62 | 3.12 | Medium | 535 |

FIGURE 5

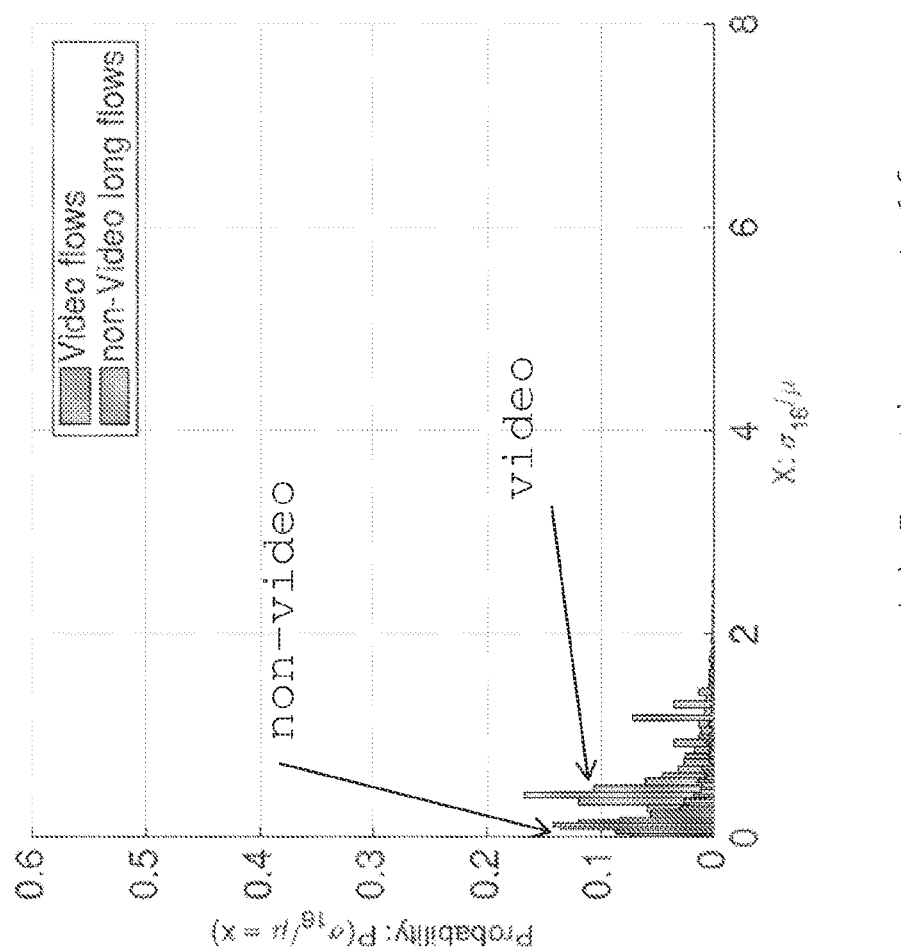

(g) Burstiness at 16s

PROCESS AND APPARATUS FOR IDENTIFYING AND CLASSIFYING VIDEO-DATA

RELATED APPLICATIONS

The present invention is a U.S. National Stage under 35 USC 371 patent application, claiming priority to Ser. No. PCT/AU2018/051036, filed on 21 Sep. 2018; which claims priority of AU 2017903915, filed on 27 Sep. 2017, the entirety of both of which are incorporated herein by reference.

TECHNICAL FIELD

The present invention relates to a process and apparatus for identifying and classifying network data and, particularly but not exclusively, to a method and apparatus for identifying and classifying video data, augmented-reality data, virtual-reality data and other large data streams travelling over a network.

BACKGROUND

Internet networking technology has revolutionised our lives in recent decades. An internet network provider provides its users with ability to access content from various sources, and the content downloaded by the users typically includes audio-data, video-data, online-messaging, website-browsing, social-media browsing and file transfer (e.g., including the use of Facebook™, Instagram™, and Whatsapp™) and so on.

It is desirable for the network providers to understand how their network is being used, and what type of content is being accessed by the users. Large data streams, mainly video-data, constitute a majority of network traffic today. Currently, network providers have very limited visibility into the traffic travelling over their network, and this limited visibility hinders the network provider's ability to identify and resolve data capacity problems faced by the network. Currently, they are addressing data capacity problems by increasing the bandwidth of their networks, which is an expensive solution.

In order to better manage data traffic (for quality and cost reasons), it would be advantageous for the network providers to have visibility into microscopic aspects, such as how many video streams are concurrently active at a time, what their durations are, what resolutions they operate at, and how often they adapt their rate. Visibility into these attributes can allow them to better understand both content characteristics and data viewing patterns, so they can implement useful changes to tune their network to meet content-provider expectations and enhance user experience.

There are two major technologies currently being used to understand network traffic. The first technology is hardware-based and is known as Deep Packet Inspection (DPI). This technology analyses each and every packet travelling through the network using hardware that is very expensive, both economically and computationally (because a high processing power is required to analyse each and every packet). Another disadvantage of this technique is that it provides limited scalability. For at least these reasons, DPI is not practical to implement for most network operators.

The second technology makes use of packet inspection software for packet-analyses and flow-analyses separately. This technique is also computationally very expensive and is of limited scalability.

Video traffic is rapidly increasing every day and it is supposed to increase even further in the near future as higher resolutions (e.g., 1440p and 4K) become more prevalent, and augmented and virtual reality begin to take off.

For at least the above reasons, network providers need better visibility into their networks, in particular to solve network capacity problems in an efficient and cost effective manner, and to improve user experience.

It is desired, therefore, to provide a network traffic monitoring process and system that overcome or alleviate one or more difficulties of the prior art, or to at least provide a useful alternative.

SUMMARY

In accordance with some embodiments of the present invention, there is provided a network traffic monitoring process executed by a network traffic monitoring component of a communications network, the process including:
  receiving data packets from a software-defined networking (SDN) flow switch of a communications network;
  processing header fields of the received data packets to identify subsets of the data packets as belonging to respective network flows;
  detecting large network flows by determining, for each of the network flows, a corresponding cumulative amount of data contained in the received packets for the network flow until the cumulative amount of data reaches or exceeds a predetermined threshold amount of data;
  for each detected large network flow, sending flow identification data to the SDN flow switch to allow the SDN flow switch to identify further packets of the large network flow as being packets of the large network flow and to stop sending the further packets of the large network flow to the network traffic monitoring component;
  for each large network flow, periodically receiving from the SDN flow switch corresponding counter data representing amounts of data contained in packets of the large flow forwarded by the SDN switch;
  for each large network flow, processing the corresponding counter data and corresponding timestamp data to generate temporal metrics of the large network flow; and
  for each large network flow, processing the generated temporal metrics with a trained classifier to classify the large network flow as being one of a plurality of predetermined flow types.

In some embodiments, the flow types include video flows and non-video flows.

In some embodiments, the flow types include video flows of respective different resolutions.

In some embodiments, the process includes determining service providers of at least some of the large network flows from DNS information.

In some embodiments, the flow metrics include idle time, average rate, and metrics of burstiness.

In some embodiments, the flow metrics include metrics of burstiness at respective time scales.

In some embodiments, the time scales represent a geometric series.

In accordance with some embodiments of the present invention, there is provided a network traffic monitoring process executed by a software-defined networking (SDN) flow switch of a communications network, the process including the steps of:

receiving a data packet from the communications network;

processing the received data packet to determine whether the data packet is a packet of a plurality of predetermined large network flows, and if so, to identify a corresponding one of the predetermined large network flows;

if said processing identifies a corresponding predetermined large network flow of the data packet, then updating corresponding counter data representing a corresponding amount of data of the large network flow;

otherwise, if the data packet is not determined to be a packet of the plurality of predetermined large network flows, then forwarding the data packet to a component of a network traffic monitoring system to determine whether the data packet is a packet of a large network flow that is not one of the predetermined large network flows;

receiving large flow identification data from a component of the network traffic monitoring system, the large flow identification data identifying at least one further large network flow that is not one of the predetermined network flows;

processing the received large flow identification data to add the at least one further large network flow to the predetermined large network flows so that the processing step will determine that further data packets of the at least one further large network flow are packets of the at least one further large network flow and consequently the SDN flow switch will not forward the data packet to the component of the network traffic monitoring system; and periodically sending, to a component of the network traffic monitoring system, counter data representing amounts of data contained in respective ones of the predetermined large network flows.

In accordance with some embodiments of the present invention, there is provided a network traffic monitoring system, including:

a large flow detection component configured to:
(i) receive data packets from a software-defined networking (SDN) flow switch;
(ii) process header fields of the received data packets to identify subsets of the data packets as belonging to respective network flows;
(iii) detect large network flows by determining, for each of the network flows, a corresponding cumulative amount of data contained in the received packets for the network flow until the cumulative amount of data reaches or exceeds a predetermined threshold amount of data;
(iv) for each detected large network flow, send flow identification data to the SDN flow switch to allow the SDN flow switch to identify further packets of the large network flow as being packets of the large network flow and to stop sending the further packets of the large network flow to the large flow detection component; and a flow analysis component configured to:
(i) for each large network flow, periodically receive from the SDN flow switch corresponding counter data representing amounts of data contained in packets of the large flow forwarded by the SDN switch;

(ii) for each large network flow, process the corresponding counter data and corresponding timestamp data to generate temporal metrics of the large network flow; and
(iii) for each large network flow, process the generated temporal metrics with a trained classifier to classify the large network flow as being one of a plurality of predetermined flow types.

In some embodiments, the system includes a user interface component configured to receive user requests and, responsive to the requests, to generate user interface data representing an interactive user interface for displaying information on large network flows detected by the system, the information including classifications of the large network flows.

In accordance with some embodiments of the present invention, there is provided at least one computer-readable storage medium having stored thereon executable instructions that, when executed by one or more processors, cause the one or more processors to execute the process of any one of the above processes.

In accordance with some embodiments of the present invention, there is provided a network traffic monitoring system configured to execute the process of any one of the above processes.

In some embodiments, the system includes a software-defined networking (SDN) flow switch configured to:
receive a data packet from the communications network;
process the received data packet to determine whether the data packet is a packet of a plurality of predetermined large network flows, and if so, to identify a corresponding one of the predetermined large network flows;
if said processing identifies a corresponding predetermined large network flow of the data packet, then update corresponding counter data representing a corresponding amount of data of the large network flow;
otherwise, if the data packet is not determined to be a packet of the plurality of predetermined large network flows, then forward the data packet to a component of a network traffic monitoring system to determine whether the data packet is a packet of a large network flow that is not one of the predetermined large network flows;
receive large flow identification data from a component of the network traffic monitoring system, the large flow identification data identifying at least one further large network flow that is not one of the predetermined network flows;
process the received large flow identification data to add the at least one further large network flow to the predetermined large network flows so that the processing step will determine that further data packets of the at least one further large network flow are packets of the at least one further large network flow and consequently the SDN flow switch will not forward the data packet to the component of the network traffic monitoring system; and
periodically send, to a component of the network traffic monitoring system, counter data representing amounts of data contained in respective ones of the predetermined large network flows.

In some embodiments, the flow types include video flows and non-video flows, and optionally the flow types include video flows of respective different resolutions.

In some embodiments, the flow metrics include idle time, average rate, and metrics of burstiness.

Also described herein is a method of monitoring data traffic over a network, the data traffic comprising a plurality of data streams, the method comprising the steps of monitoring data in each data stream for determining a data type for each data stream, and implementing flow telemetry for a predetermined at least one of the data types, to determine flow volume for each data stream of the predetermined data type.

It is known that conventional method of deep packet inspection monitors every single packet of each data stream. Considering the size of network traffic, this is unscalable, takes a long time, and is extremely expensive to implement.

Also described herein, monitoring of network traffic is achieved by combining packet-level monitoring with flow-level monitoring. In an embodiment, the step of monitoring data of a data stream comprises the step of obtaining data packets until a threshold is reached. Advantageously, in an embodiment, therefore only some of the data packets are monitored (e.g. the first few Mega-Bytes of every data stream). In an embodiment, this limited packet inspection provides sufficient information to determine data type, content provider's information, address of content request, and so on. In an embodiment, this is followed by flow-level monitoring of the data stream, which can be used to implement a classification analysis to classify the data streams of the identified data type into different data categories.

In an embodiment, the threshold is chosen to trigger flow level monitoring for data types which comprise large volume data flows. These are otherwise known as "elephants", and include large downloads, video streaming, augmented reality, virtual reality data streams and other large data flows. Data flows that do not achieve the threshold generally comprise small data flows ("mice"), such as social network posts and the like. While mice comprise the majority of data types, elephants take up most volume of data traffic. Ignoring the mice, means that it is possible for embodiments of the invention to concentrate on the elephants, being the large data volume flows.

The method described herein is highly scalable because only a limited number of data packets of a data stream undergo packet-level monitoring. This provides a low cost and highly scalable solution for monitoring and classifying network traffic. Further, the method concentrates on the large volume data flows and ignores the mice, further optimising processing.

The step of obtaining the data packets may comprises mirroring data packets of the data stream.

It is an advantage of at least an embodiment of the present invention that the data packets of the data stream being examined are not affected or modified. This is because the packet inspection is performed on mirrored data packets.

As described herein, the step of obtaining the data packets of a data stream is stopped when the threshold is reached and the data type of the data stream is determined.

As described herein, the step of monitoring data is implemented via a software defined networking (SDN) solution. As described herein, flow telemetry is implemented by utilising hardware counters.

The balance between hardware and software processing reduces costs, increases scaleability, and enables extraction of enough information from the data for implementation of a classification analysis.

As described herein, the method comprises the further step of carrying out a classification analysis to classify the predetermined data type into one of a plurality of data categories. The data categories may comprise classifying into data resolution e.g. high definition, medium definition, low definition. The categories may also comprise data relating to a provider identity (e.g. Netflix™, YouTube™ etc.). The categorisation may comprise identifying type of data e.g. video, large download etc.

As described herein, the classification of the predetermined data type is based on characteristics of the data, comprising one or more of: scanned profile, size of data stream, resolution and data provider's information.

As described herein, a process of machine learning is implemented to improve the classification analysis.

Also described herein is an apparatus for monitoring data traffic over a network, the data traffic comprising a plurality of data streams, the apparatus comprising at least one processor arranged to monitor data in each data stream and determine data type for each data stream, and arranged to implement flow telemetry for a predetermined at least one of the data types, to determine flow volume for each data stream of the predetermined data type.

The processor may comprise a software defined network application which is arranged to instruct obtaining data packets of the data stream until a threshold is reached. In an embodiment, the processor comprises an large flow detector arranged to inspect the data packets. In an embodiment the data packets are obtained by mirroring data packets of the data stream.

The processor is arranged to collect hardware counters to implement the flow telemetry.

As described herein, the processor is arranged to examine the predetermined data type and classify the data streams of the data type into one of a plurality of data categories. In an embodiment, machine learning is used to profile the data streams and categorise them. A database is provided to store characteristics of data streams to enable classification.

In an embodiment, the apparatus comprises a user interface presenting information on the data types and categories and flow stream analysis.

Also described herein is a computer program, arranged to instruct a processor to implement any of the above methods.

Also described herein is a non-volatile computer readable medium, providing a computer program in accordance with the third aspect of the invention.

Also described herein is a data signal comprising any of the above computer programs.

BRIEF DESCRIPTION OF THE DRAWINGS

Some embodiments of the present invention are hereinafter described, by way of example only, with reference to the accompanying drawings, in which:

FIGS. 5 and 6 show snapshots of a web-interface provided to network administrators to visualize information related to video streams in their network;

FIG. 11(*a*) shows merit of attributes, FIG. 11(*b*) shows the accuracy of video identification, and FIG. 11(*c*) shows the accuracy of resolution classification;

DETAILED DESCRIPTION

Embodiments of the present invention include a network traffic monitoring system and process that are able to classify data packets flowing through a communications network into different network flows, and to characterise those flows by type and traffic properties. Although some embodiments of the present invention are described below in the context of monitoring flows of video data in a communications network, it should be understood that the network traffic monitoring apparatus and process are not limited to video data but can be generally applied to identify and characterising flows of any type of network traffic in a communications network.

Software Defined Networking (SDN) is a flexible and versatile networking technology which uses a centralized control system that is separated from network switches and other network devices. The centralized SDN control system uses an SDN control protocol such as OpenFlow to configure SDN network devices such as network switches. In conventional networking, each switch has its own independent control software for deciding where to move data packets. However, in an SDN system, the decisions of packet-movement are ultimately made by the centralized SDN controller which controls the behaviour of the SDN switches to process packets accordingly. The SDN controller can be custom programmed, based on the network operator's needs and independent of the individual switches.

An SDN switch generally includes flow tables that define matching rules to identify whether a network packet received at an input port of the switch belongs to any of a plurality of defined or predetermined flows (also known in the art as 'packet flows', 'network flows', and 'traffic flows'), and for each such flow, an action to perform on packets belonging to the flow, typically identifying a corresponding exit port of the switch to which packets of that flow are to be output from the switch. As indicated above, the flow tables of an SDN switch can be dynamically modified by an SDN controller via an SDN control protocol such as the OpenFlow protocol.

The inventors have determined that an SDN-based system is well suited for identifying and classifying network traffic flows (including video traffic flows) traversing through a communications network. The inventors have developed an SDN-based apparatus that includes an independently programmable controller and SDN switches, which in the described embodiments are low cost off-the-shelf OpenFlow switches. This system operates at a much higher speed in comparison to conventional DPI and packet inspection software processes.

1. System Design and Architecture

Figure 1:
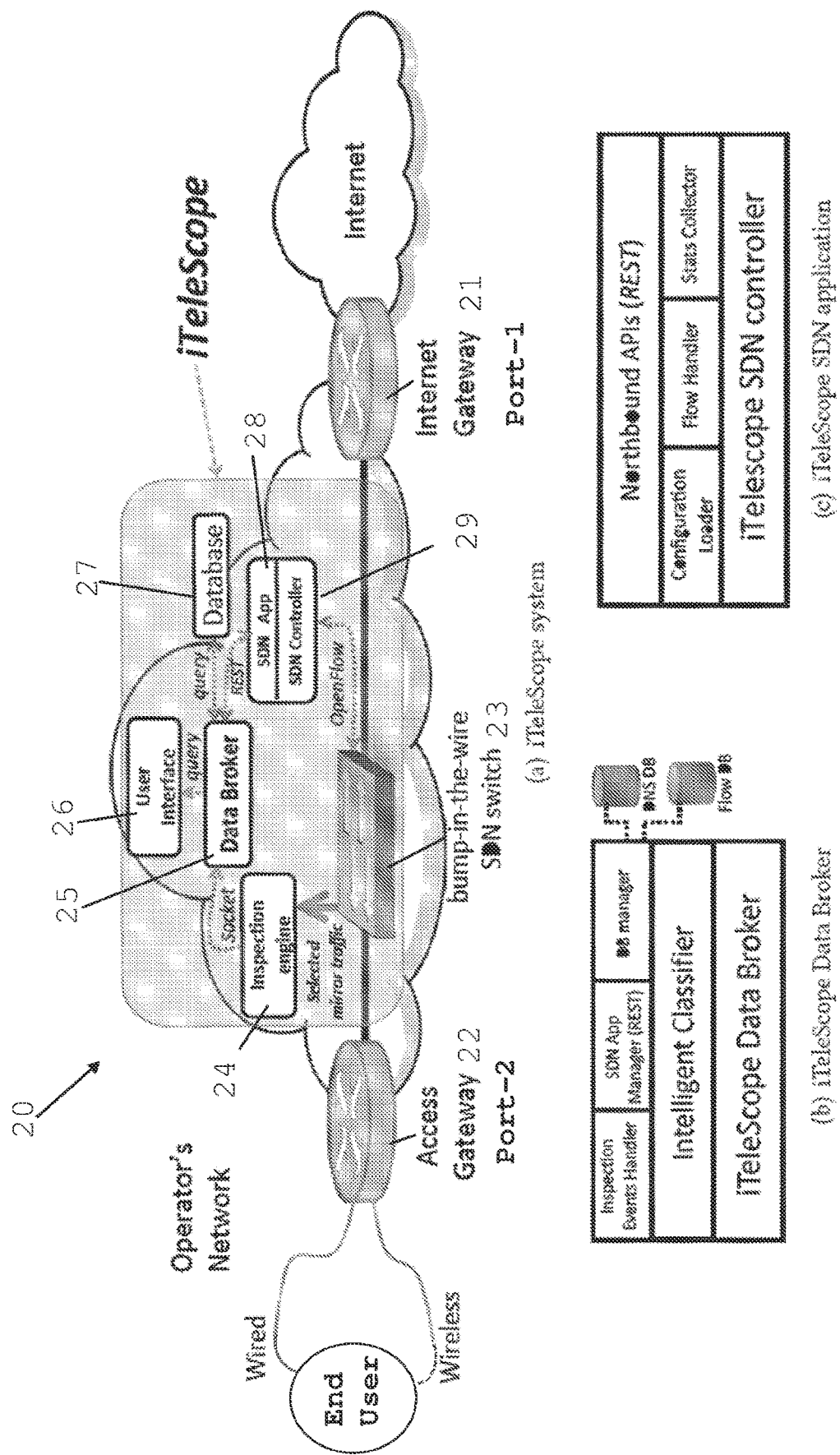
FIG. 1 shows architecture and functional blocks of a network traffic monitoring system in accordance with the described embodiments of the present invention.

FIG. 1(*a*) shows the architecture and functional blocks of a network traffic monitoring apparatus applied to a carrier network, in accordance with an embodiment of the present invention. In this embodiment, the network traffic monitoring apparatus can be transparently inserted between two ports of a network where network traffic monitoring (video monitoring in the described embodiment) is desired. The apparatus 20 is inserted between an internet gateway 21 and an access gateway 22 of the network. The end user (on the very left of FIG. 1(*a*)) can be connected to the network through the access gateway 22 using either wired (DSL, Ethernet, Fiber) and/or wireless (e.g. 3G/4G, WiFi) technology. The video content providers are on the right, connected to the carrier/enterprise network through the Internet gateway 21. The apparatus 20 can be inserted into any desired link as a 'bump-in-the-wire' where network data inspection is required.

As shown in FIG. 1(*a*), the apparatus 20 includes an SDN switch 23, a large flow detector 24, a data broker 25, a user interface 26, a Database 27, and an SDN Application 28 on an SDN controller 29.

Network traffic from the content provider enters the apparatus 20 from the internet gateway 21, and exits at the access gateway 22 and towards the end user. Typically, the network traffic includes all sorts of data flows, including streamed video files, streamed audio files, large download files, small data flows representing social-media browsing and mobile application messaging, and so on.

In the described embodiment, the video files streamed by users through the network are monitored as follows.

In an example greenfield installation, the SDN switch 23 is initially configured to mirror all of the data packets of every incoming flow to the large flow detector 24. The large flow detector 24 keeps track of the volume of each flow until a pre-determined threshold flow volume is reached or exceeded, and then it notifies the data broker. In one embodiment, the pre-determined threshold volume is in the range of 2 to 20 Mega-bytes, depending upon the type of video flows to be identified. In another embodiment, the threshold volume is set to 4 Mega-Bytes. If the flow volume is greater than the corresponding threshold, then it is deemed to be a "heavy-flow" (or as an "Elephant-flow", using a term of art). The heavy-flow can either be a video stream or a large-sized downloadable file or downloadable video whose flow volume and duration are larger than the pre-determined threshold volume and period. Once an elephant-flow is identified, the data broker 25 instructs the SDN application 28 to insert a reactive flow-entry for this specific flow into the SDN switch 23, and to stop the mirroring of packets for this flow. This relieves the large flow detector 24 from performing further analysis of the elephant-flow. As a result, the scalability of the large flow detector 24 is substantially improved in comparison to conventional DPI and software-inspection systems.

Once an elephant-flow has been identified and a reactive entry for the elephant flow is saved in a flow-table of the SDN switch 23, the data broker 25 polls the counters of the SDN switch 23 periodically to develop a traffic profile for this elephant-flow. In this specification, a traffic profile of a flow includes information regarding the identity of the flow and the identity of the content provider of that flow. FIGS. 1(*b*) and 1(*c*) respectively represent internal modules of the data broker 25 and the SDN Application 28 that collect telemetry, develop traffic profiles, and perform the flow identification and classification processes. The data broker 25 includes two intelligent processes, namely: (i) a video-identifier, and (ii) a video-classifier. Different types of elephant-flows have different traffic rate profiles. Based on these characteristics, the video-identifier is used to identify video streams from the other types of traffic flows of the identified elephant-flows. Further, the video-classifier is used to classify the identified video streams by their resolutions.

The SDN switch 23 communicates with the SDN controller 29 using an OpenFlow protocol. The SDN switch 23 acts as a hardware filter that limits the fraction of traffic (typically to the first few Mega-Bytes of traffic from a flow) mirrored for flow analysis, while the SDN application 28 creates reactive flow-table entries for elephant flows that are then monitored via the hardware counters and (Group) Table 3. The thresholds are tuned on flow volume and duration at which a reactive flow-entry gets created, and the inventors have found empirically that a value of 4 Mega-Bytes for volume threshold works well—this keeps the hardware flow-mod operations to less than 1% of all flows (in the inventors' trials over 99% of flows are short), while limiting the packet mirroring to the large flow detector 24 to less than one-third of link traffic (since around 75% of traffic volume is carried in elephant flows). This balance between hardware and software processing reduces cost, increases scalability, and enables extraction of enough information for machine learning algorithms to achieve high classification accuracy.

2. Flow Table Management

Figure 2:
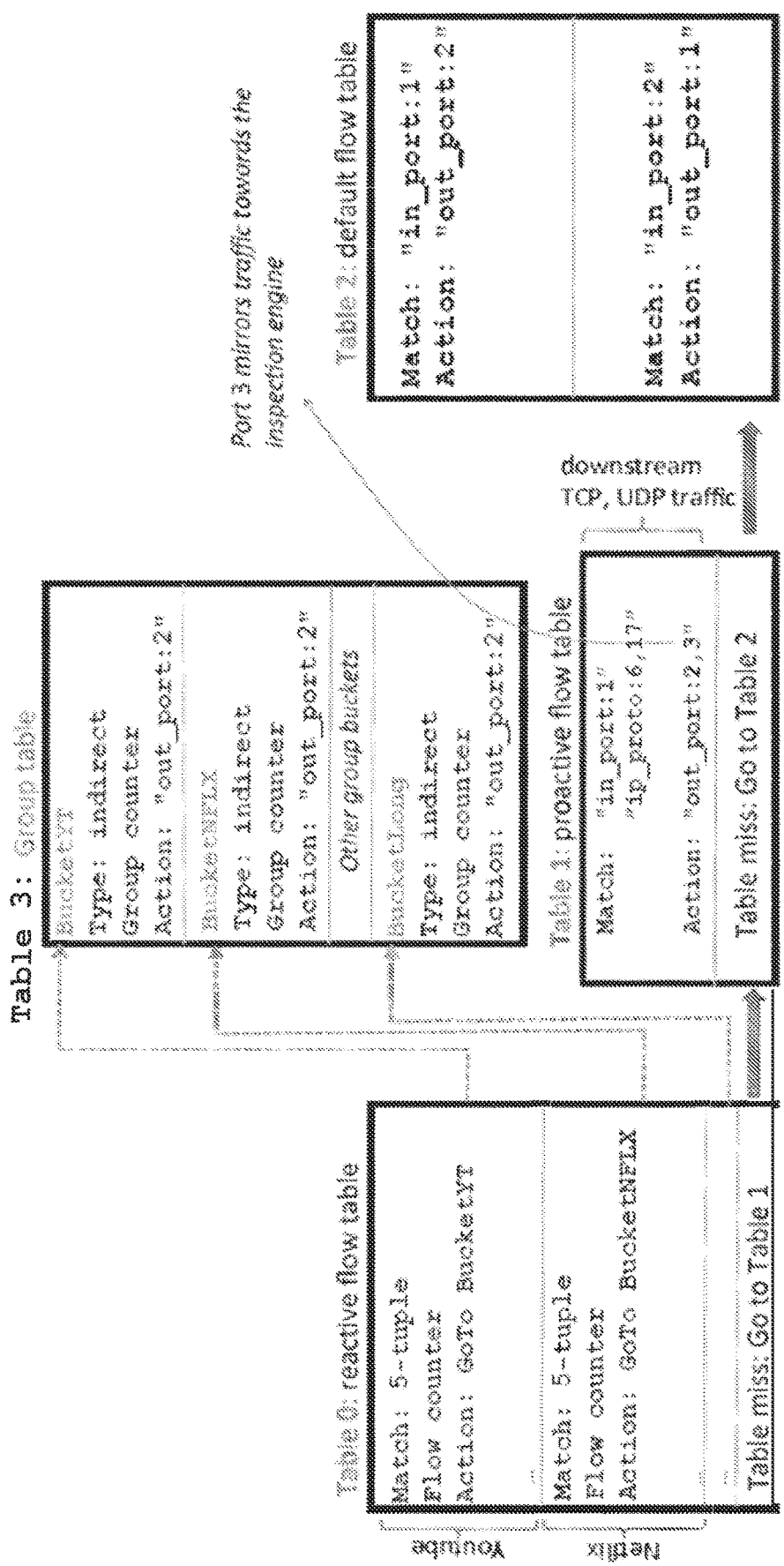
FIG. 2 shows flow table structure of an SDN switch of the system, in accordance with an embodiment.

FIG. 2 illustrates a multiple flow-table structure of the SDN switch 23. These flow tables of the SDN switch 23 are configured to identify and categorise incoming flows. Table 0 and Table 1 are a reactive flow table and a proactive flow table, respectively, and are used to store reactive and proactive entries, respectively. Table 2 is a default flow table, and table 3 is a group table. Using the flow tables, a match command is used to identify known incoming flows, and corresponding action commands are used to perform an appropriate action of moving the flow to the corresponding entry in the group table (Table 3).

Reactive rules of Table 0 match on 5-tuples for known flows. A 5-tuple is an ordered set of five values that identify a flow. Reactive rules of Table 0 are of highest priority, and are installed as a consequence of elephant flows identified by the large flow detector 22. They automatically time out (and are removed from the table) upon a pre-defined period of inactivity ranging from 10 seconds to 60 seconds. The reactive flow entries achieve two objectives: (i) to stop mirroring elephant-flow packets to the software large flow detector 24, and (ii) to provide flow-level telemetry (flow characteristics) for the individual (potentially video) elephant-flows. The action corresponding to a match in the reactive table (Table 0) sends the flow to its appropriate entry in the group table (Table 3), which identifies the content provider (YouTube, Netflix etc.). The content provider for the flow is identified by searching for the server IP address in the most recent captured DNS suffixes (e.g. googlevideo.com or nflxvideo.com) that are stored in a time-series database table (the "flow DB" in FIG. 1(*b*)) by the large flow detector 24. If a video stream from a new DNS suffix is detected (e.g. ttnvw.net), then a new group entry (for Twitch in this example) is created dynamically in the group table. This not only makes the apparatus 20 adaptive to new video content providers, but also allows tracking aggregate video volumes for each video content provider by storing them in the group table. Therefore, the reactive flow table is used for fine grain visibility whereas the group table is used for coarse level visibility of video flows detected by the apparatus 20.

Proactive entries (Table 1) are statically pushed by the SDN controller 29 so that all Transmission Control Protocol (TCP) (proto=6) and User Datagram Protocol (UDP) (proto=17) packets received from the content provider, that have not already matched an elephant flow (Table 0), are forwarded to port-2 (i.e. access gateway 22) and mirrored at port-3 by the SDN switch 23 to the large flow detector 24. This includes DNS reply packets that contain the domain names of video content providers and the video server IP addresses. All other types of packets are sent to Table 2, where the default action is to cross-connect the input (internet gateway 21) and output (access Gateway 22) ports without performing any mirroring or processing.

The apparatus 20 does not send any data packets to the SDN controller 29, thereby minimizing the load on the SDN controller 29, reducing packet-forwarding latency, and immunizing against failures of the SDN controller 29.

It is an advantage of the apparatus 20 that it is completely transparent to the network. This is because the SDN switch 23 makes copies of the packets that require monitoring and sends them to the large flow detector 24. The SDN switch 23 forwards one copy of the data packets to their traffic path without interruption. The apparatus 20 does not modify packets.

Another advantage of the apparatus 20 is that it does not overload the SDN controller 29. The SDN switch 23 does not send any data packets to the SDN controller 29; instead, any packets that need to be inspected are sent as copies to the large flow detector 24. This protects the SDN controller 29 from overload from the data-plane, allowing it to service other SDN applications.

3. Large Flow Packet Detector

The large flow packet detector 24 is also responsible for keeping track of new flows, including 5-tuple information, duration, and volume, using efficient in-memory data structures. If a flow is active for more than a threshold volume, it is deemed to be an elephant flow, and the large flow detector 24 informs the Broker 25, which then makes a RESTful API call to the SDN controller 29 to insert a corresponding reactive flow-table entry into the SDN switch 23. This suppresses data-plane traffic for this flow from being mirrored to the large flow detector 24, and also triggers telemetry for that elephant flow.

The other responsibility of the large flow detector 24 is detection of DNS A-type replies, upon which it extracts the domain name and server IP addresses, and sends these via JSON to the data broker 25, which writes it into a time-series DNS database table of the database 27. This database 27 is used to associate each video stream with its content provider.

4. Telemetry Process

The data broker 25 queries per-flow statistics (counters), stores them in a time-series flow database table ("Flow DB"

in FIG. 1(b)) with timestamp information representing a corresponding timestamp of each query (e.g., the current time), and exposes the stored data to the user interface via appropriate RESTful APIs. The telemetry collects per-flow (fine grain) and per-group (coarse grain) usage statistics using the Stats collector module of our SDN application.

4.1 Video Identification:

In accordance with the above discussion, the large flow detector 24 identifies all elephant flows, which may include a mixture of video streams and other elephant flows, and then stops their packets from being mirrored.

A video identification process is executed to distinguish video streams from elephant transfers, and to identify their content providers and resolutions. At a high level, the video identification process: (a) determines attributes of a given flow, which are then fed into an intelligent classifier to distinguish video streams from elephant transfers, (b) queries the DNS database ("DNS DB" in FIG. 1(b)) using the flow's client/server IP address to associate the video stream with its content provider, and (c) estimates the resolution of the video stream (in the described embodiment, the resolution being estimated as one of Low, Medium, High, or Ultra-high).

4.2 Usage Collection and Storage:

The data broker 25 collects counter data representing flow counters per content provider (group table) and per video stream reactive flow table entry. While the number of entries in the group table is generally relatively small and fixed, the number of reactive flow entries can vary significantly with time. Polling the latter when the number of entries is large can result in a multi-part reply—for example a Noviflow SDN switch 23 breaks the response into chunks of 2500 flows each—putting considerable strain on the agent in the switch 23, and consequently affecting timeliness of the results. To mitigate this effect, in the described embodiment the apparatus 20 tunes the polling frequency depending on the number of entries in the reactive flow table. Specifically, when the number of reactive flow entries is less than 2500, the apparatus 20 polls the counters every second, but reduces the polling frequency to once every 4 seconds when the number of entries exceeds 10,000. When the data broker 25 stores counter data received from the SDN switch 23, it stores the received counter data together with corresponding timestamp information so that flow profiles representing the temporal characteristics of each flow can be generated. The flow/group-level counters are thus stored in a time-series Flow DB, as shown in FIG. 1(b), and are periodically sent in a JSON-formatted message to a machine learning process of the data broker 29, as described below.

5. Classification Using Machine Learning

The data broker 29 executes a machine learning classification processes to determine whether traffic pertaining to a flow is streaming video or not (a "video identifier" process), and if so, to determine the video stream resolution (a "resolution classifier" process).

Figure 3:
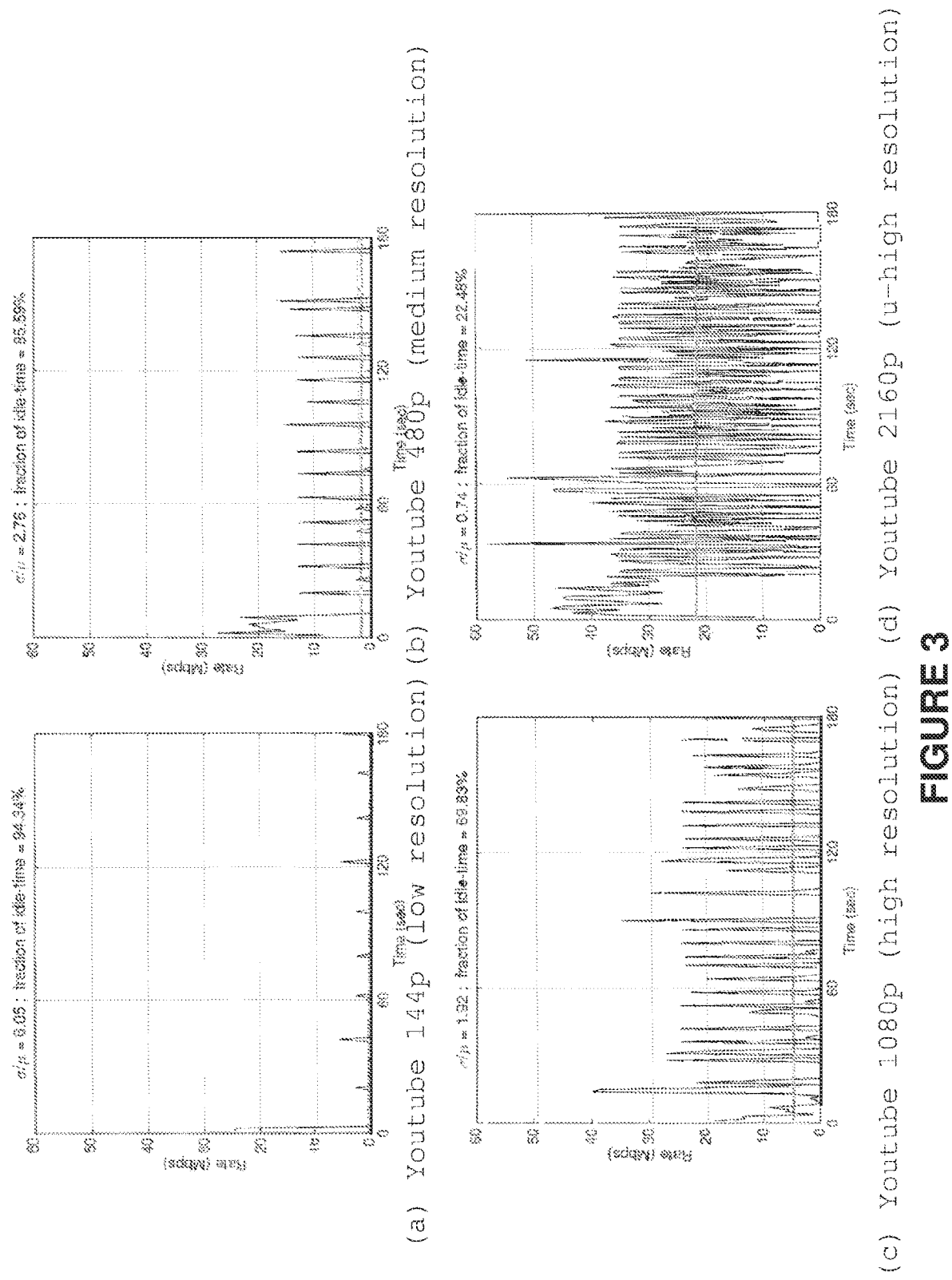
FIG. 3 shows a comparison between various traffic profiles observed for various video streams provided by different video providers.
Figure 3:
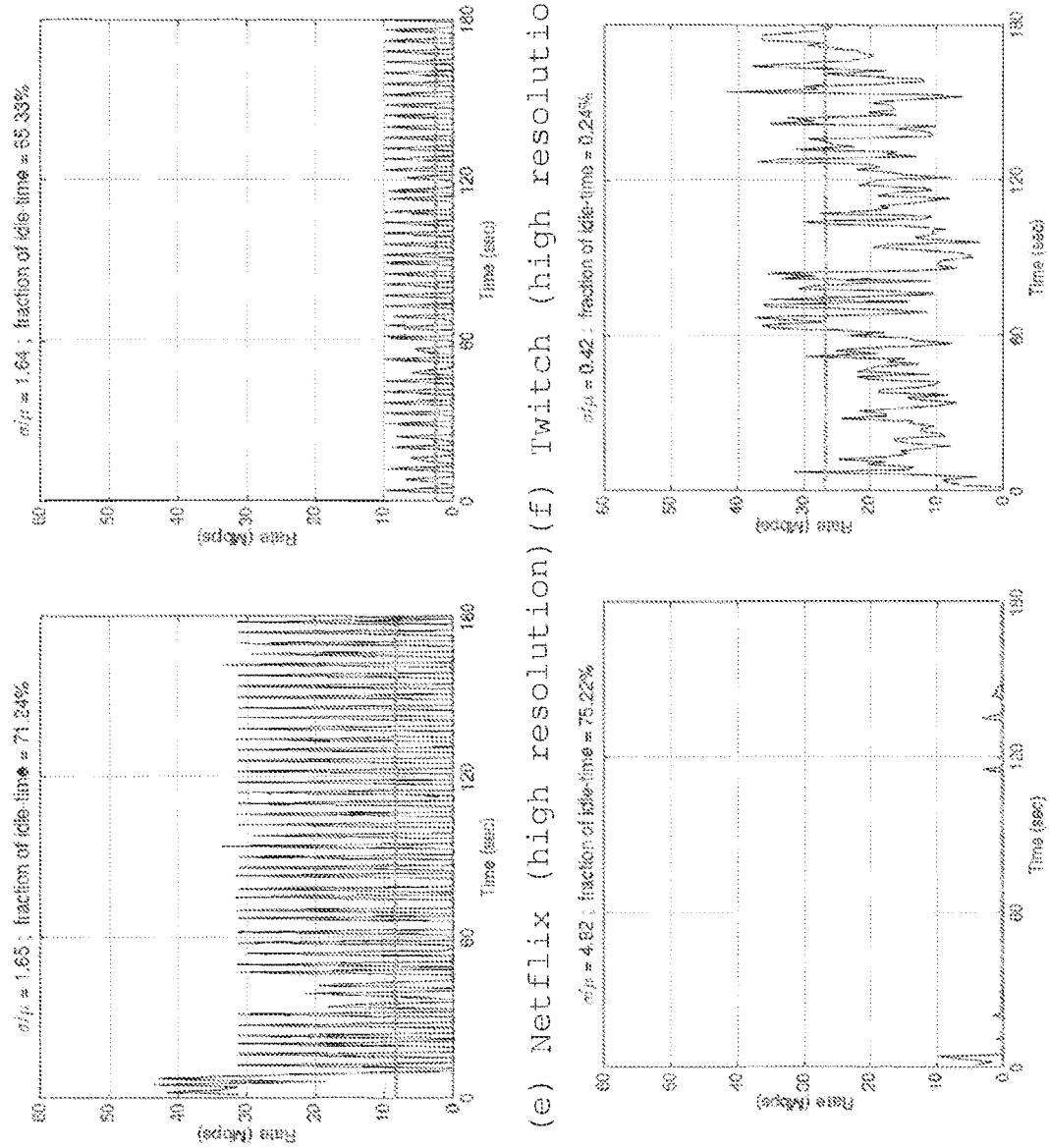

5.1 Attributes:

Attribute selection is of paramount importance for training classifiers, given that classifiers should be predictive to correctly identify and classify video streams. FIG. 3 shows plots of traffic patterns observed for various video streams of different content providers, for example, Youtube™, Netflix™ and Twitch™ (at different resolutions: low, medium, high and ultra-high definition), and other elephant flows including those of the Facebook™ application and large downloads (representative of bulk transfers or Google-Drive™ or Dropbox™ cloud storage synchronization) during the first three minutes of their activity It can be seen that, due to the buffering that accompanies video streaming, the idle-time characteristic (i.e., the fraction of time that no data is exchanged) of video flows in FIGS. 3(a) to 3(f) is quite distinctive compared to the large download flow in FIG. 3(h)). The average rate (shown by dotted red lines) of the Youtube™ 2160p (4k ultrahigh definition video) in FIG. 3(d) is much higher than that of other video resolutions (shown in FIGS. 3(a)-3(c) and 3(e)-3(f)), but is comparable to the large download in FIG. 3(h). In addition to idle-time and average rate, the burstiness characteristic of each flow is also distinctive—the low resolution video and the large download exhibit the most and the least bursty patterns respectively, among these representative profiles shown in FIG. 3. Based on these visual observations, it is evident that idle-time, average rate and burstiness are collectively able to identify and classify video flows. For example, the Facebook™ application flow shown in FIG. 3(g) exhibits similar characteristics of video streams (shown in FIGS. 3(b)-3(c)) in terms of idle-time and burstiness, but its rate is far below those of video streams.

The average rate and fraction of idle-time for a flow can be computed over a moving window (of say one minute). Burstiness of flow traffic can be computed in various ways, and it is noted (particularly in the characterisation of long-range dependent traffic) that it should be measured at multiple time-scales. Accordingly, in the described embodiments a coefficient of variance (i.e. the ratio of the standard deviation to the mean, $CV=\sigma/\mu$) is computed for streams at time-granularities of 1, 2, 4, 8 and 16 seconds to provide respective values denoted herein as $\sigma_1/\mu$, $\sigma_2/\mu$, $\sigma_4/\mu$, $\sigma_8/\mu$, and $\sigma_{16}/\mu$. These burstiness measures, in addition to the idle-time and average rate $\mu$ of each flow, are provided as attributes to the classifiers. Note that, for a new flow, there may be only a subset of burstiness attributes at the beginning, because computing $\sigma_{16}$ would require collection of data for at least a minute. A flow that commenced only 20 seconds ago would only be able to yield $\sigma_1/\mu$, $\sigma_2/\mu$ and $\sigma_4/\mu$ since there are fewer than 4 data points at time scales of 8-seconds and 16-seconds.

5.2 Identification/Classification

As described above, the data broker 29 executes two classifiers, namely the video identifier (to indicate whether a flow is a streaming video or not), and the resolution classifier (to determine the resolution of a video stream during playback). Each classifier is invoked periodically (every 16 seconds in the described embodiment)—initial invocation may have access to only five attributes (idle-time, $\mu$, $\sigma_1/\mu$, $\sigma_2/\mu$, and $\sigma_4/\mu$), and subsequent invocations that have access to more (burstiness related) attributes may change the classification, improving accuracy and/or identifying resolution changes. The training of the classifiers is described below.

EXAMPLE

Figure 4:
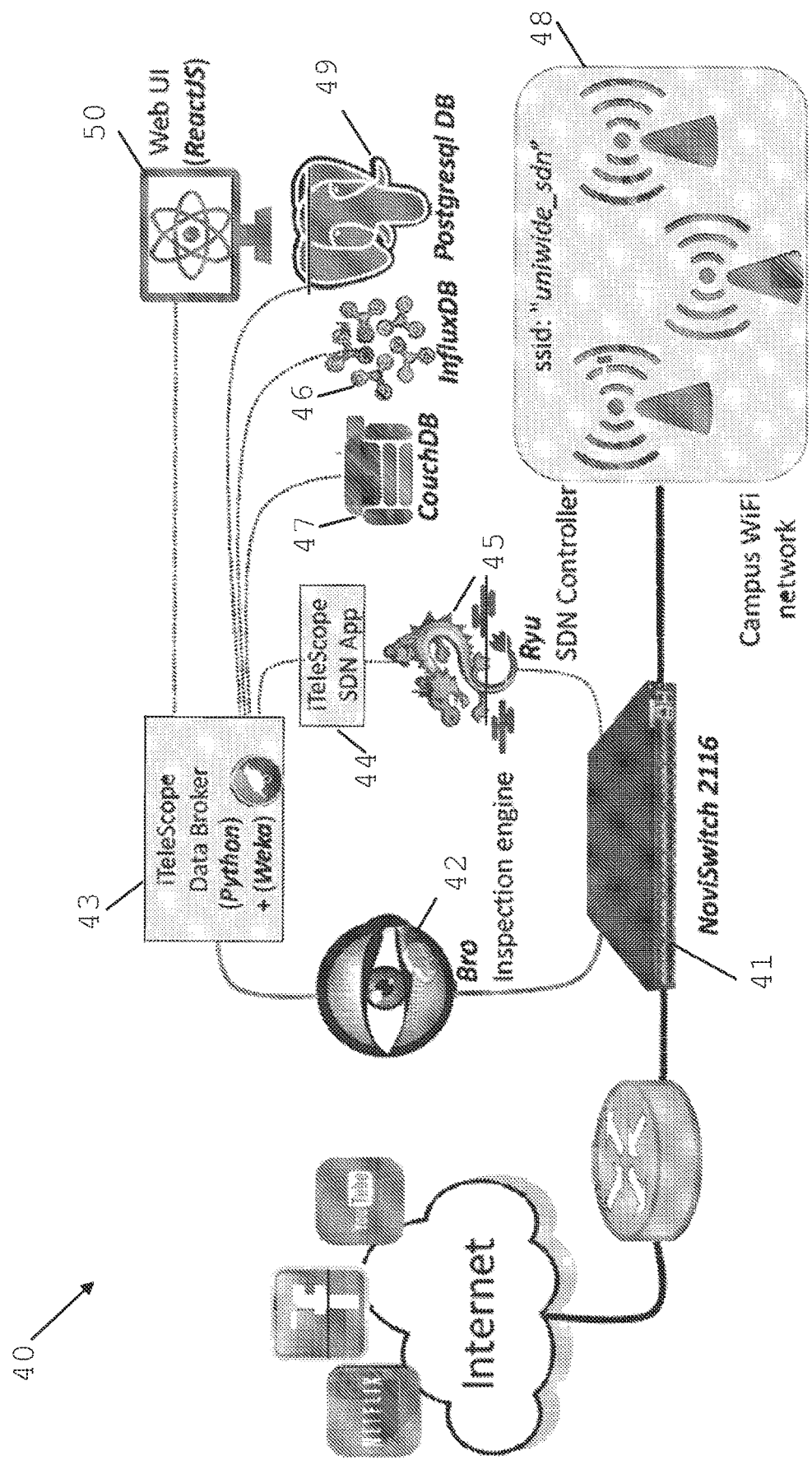
FIG. 4 shows architecture and functional blocks of a network traffic monitoring system in accordance with one embodiment of the present invention.

An embodiment of the apparatus was built using open source software components is shown in block diagram form in FIG. 4. This apparatus 40 identifies and classifies video streams in real-time at line-rates up to 10 Gbps. In this embodiment, the SDN application is implemented on top of the open source Ryu SDN controller (as described at https://osrg.github.io/ryu/), augmented by the open source Bro packet inspection engine (https://www.bro.org/) for flow state management and event triggering, and the databases are generated using the InfluxDB time-series database platform (https://www.influxdata.com/), open source relational database PostgreSQL (https://www.postgresql.org/), and CouchDB (http://couchdb.apache.org/), and a web-GUI written using the ReactJS Javascript GUI library (https://reactjs.org/) for user interaction. Further, each of these components runs in a separate docker container or virtual machine (VM) in a cloud environment provided by the VMware Esxi 6.0 hypervisor. Each of the VMs runs the Ubuntu server 14.04 LTS operating system, and is allocated a four-core CPU with 8 GB of memory and 32 GB of disk space.

This apparatus 40 is currently managing three environments: (a) an SDN-enabled experimental university campus network spanning several WiFi access points, (b) a point-to-point link over which an industrial scale Spirent traffic generator feeds traffic into our setup, and (c) a live campus dormitory network link operating at 10 Gbps and serving several hundred real users.

6.1.1 SDN Switch:

The SDN switch 41 is a fully Openflow 1.3 compliant NoviSwitch 2116, as shown in FIG. 4. It provides 160 Gbps of throughput, tens of thousands of TCAM flow entries, and millions of exact-match flow-entries in DRAM.

6.1.2 Large Flow Detector:

The Bro (v2.4.1) open-source tool 42 is used for inspection of the mirror traffic. The event-handlers were written in Bro to keep track of flow duration and volume, and to trigger an API call to the data broker when an elephant flow is detected. Similarly, DNS replies are also parsed and the information passed to the data broker 41 for recording into the time-series database.

6.1.3 Data Broker:

The data broker 43 in this embodiment is written in the Python language. The data broker 43 receives the 5-tuple of elephant flows and DNS information from the Bro large flow detector 42, inserts/modifies flow/group entries, and collects statistical data from the SDN application 44 via a RESTful API. Flow and group statistics collected from the SDN application 44 are written into a time series InfluxDB database 46. Flow level information is queried from the InfluxDB database 46 periodically for processing by the intelligent classifier powered by the Weka tool (v3.8) (as described at https://en.wikipedia.org/wiki/Weka_(machine-_learning)) using Weka's Python wrapper interface (v0.3.9). The intelligent classifier identifies video flows, queries the DNS database to label video flows, calls RESTful APIs to modify flow entries' output group, and identifies video stream resolutions.

6.1.4 SDN Controller and Application:

A Ryu (v4.0) Openflow controller 46 is used in this embodiment. The SDN application 44 is written in Python and exposes northbound RESTful APIs to the data broker 43 for inserting or modifying network rules and polling flow statistics. Successful RESTful API calls result in appropriate actions (e.g., network rule insertion, modification and counter collection) at the SDN switch 41 serving the data-plane.

6.1.5 Data Bases:

There are three databases in the system 40 to store flow usage statistics, DNS information, and system configurations. The time-series InfluxDB (v1.0.0) 46 is used to store periodic flow/group statistics. In the same InfluxDB 46, information of DNS A-type replies is also stored, including the domain name and client/server IP addresses. An object relational database PostgreSQL (v9.6.3) is used to store the mapping between domain IP addresses and domain name suffix. A NoSQL CouchDB (v2.0.0) document-oriented database is used to store configurations of the SDN switch 41 such as OpenFlow DataPath ID (DPID) and multi-table configurations.

Figure 6:
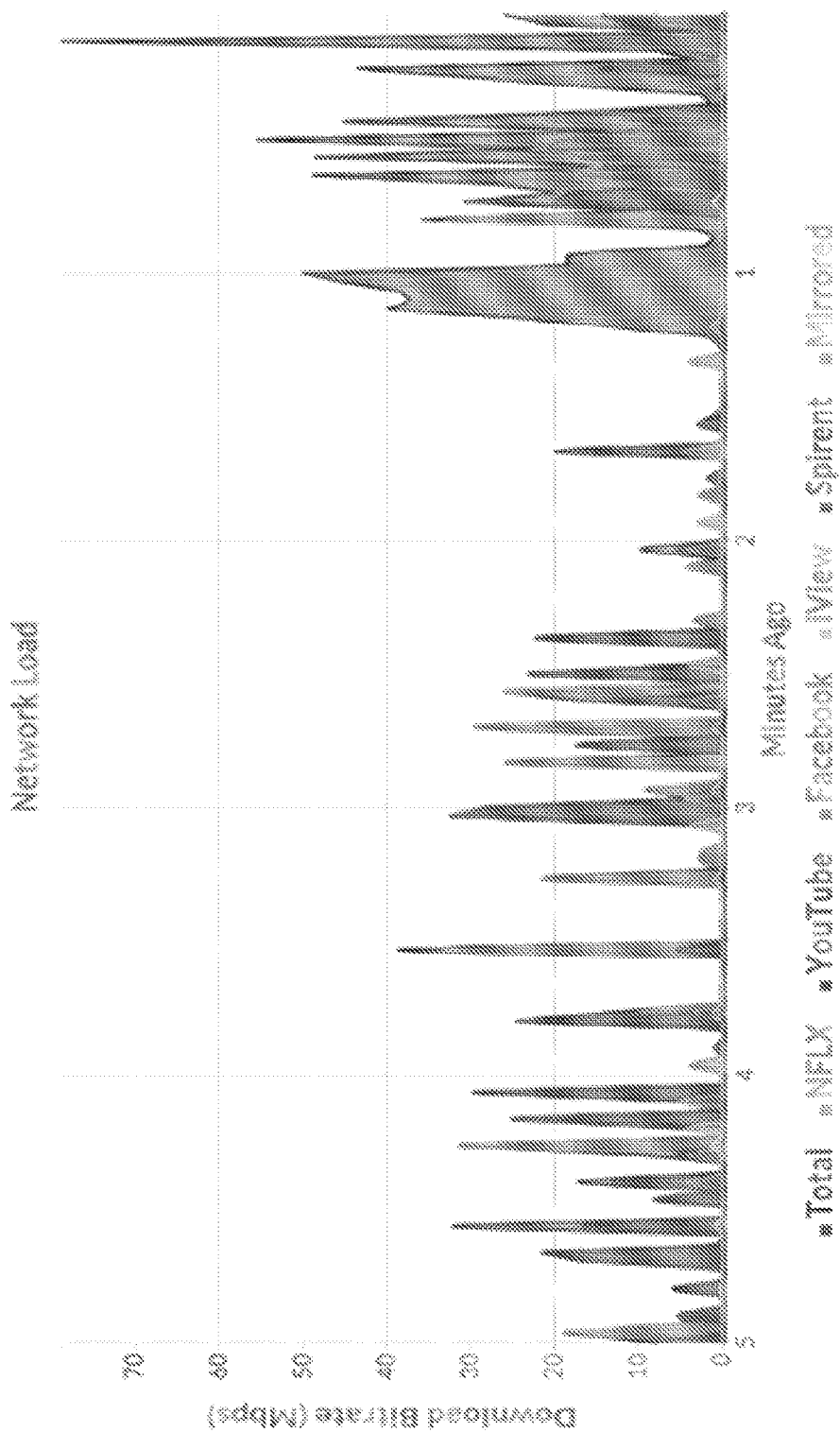

6.1.6 Web Interface:

The apparatus 40 provides an interactive graphical user interface (GUI) or 'front-end' 50 for network administrators to visualize video streams in their network, implemented in ReactJS using the Rubix template and the D3 library. Example screenshots are shown in FIGS. 5 and 6.

6.2 Machine Training

The classifiers of the apparatus 40 were trained with datasets collected by the apparatus 40 itself. In order to have the ground truth for the training, a Python script was written to generate video streaming from various providers, namely Youtube™, Netflix™, Youku™, Facebook™, Tencent™, and other long duration traffic, including large downloads (e.g., Google-Drive sync) and dynamic webpages (i.e., Office 365, Facebook homepage, WhatsApp), over an experimental WiFi SDN network called "uniwide_sdn". The Youtube Player API was used to stream videos at specified resolutions, namely low: 144p, 240p, 360p; medium: 480p, 720p; high: 1080p, 1440p; and ultra-high: 4K.

For the purpose of training, the scripts limit each flow (video and non-video) to 128 seconds (i.e. about two minutes), even though every chosen video had a total length in excess of 20 minutes. Internet browser Firefox™ version 47.0 was used to play the videos. The scripts played videos from the top 5 most popular providers, at different video resolutions, as well as different large ISO files for download and Google-Drive sync, so as to diversify the training datasets.

At the end of each two-minute activity, the script queried the InfluxDB 46 to extract the flow profile (byte counts at 1-second time interval) and calculate the attributes as described above. The 128-second traffic profile was then split into 8 sub-profiles (corresponding to time intervals of [1,16]s, [1,32]s, [1,48]s, [1,64]s, [17, 80]s, [33, 96]s, [48, 112]s, and [65, 128]s). The script lastly computed the attributes for each of the sub profiles. Note that the short sub-profiles (e.g. [1,16]s) will have incomplete attributes such as $\sigma_8/\mu$ and $\sigma_{16}/\mu$. The script was run for 2 weeks, collecting a total of 28,543 labelled training instances for elephant flows (video and non-video), of which 10,416 instances were labelled by video resolution.

Figure 7:
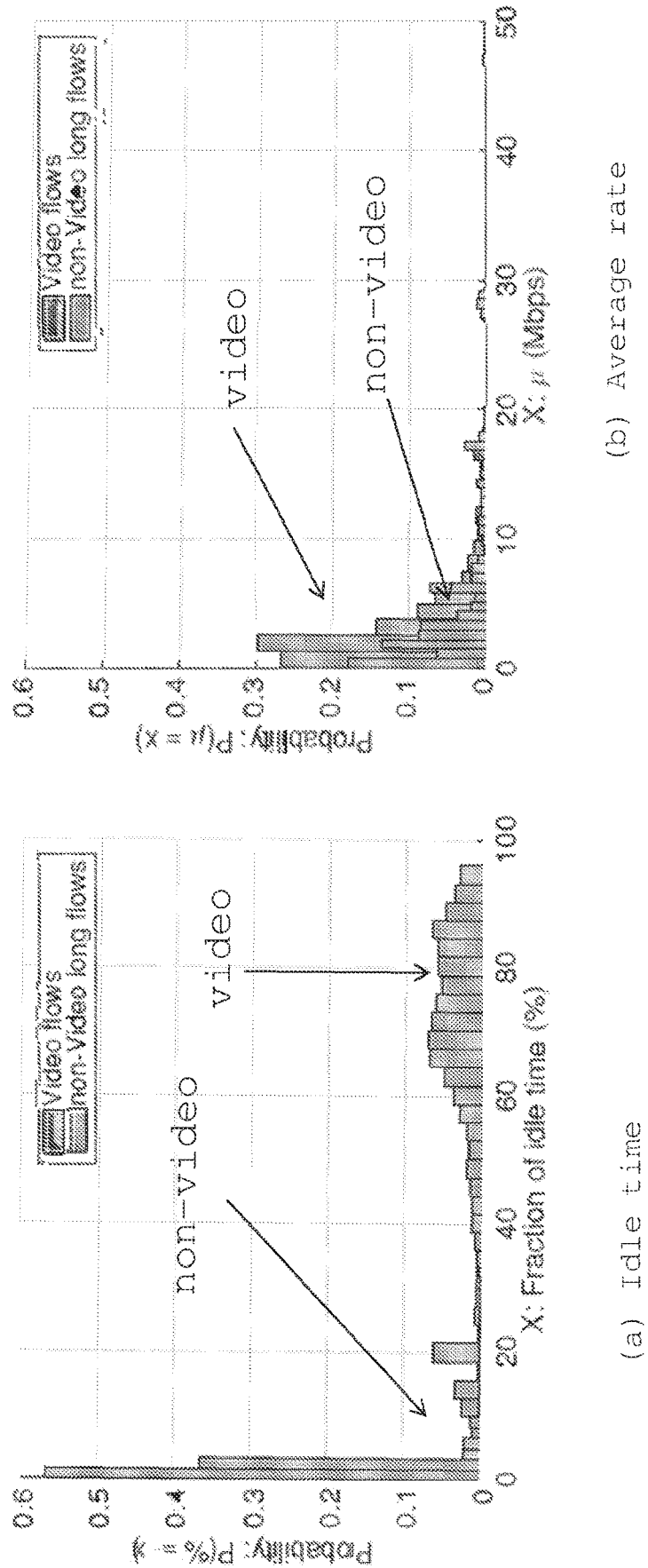
FIG. 7 shows histograms of idle-time, average rate and burstiness at various time scales for video vs. non-video streams.
Figure 7:
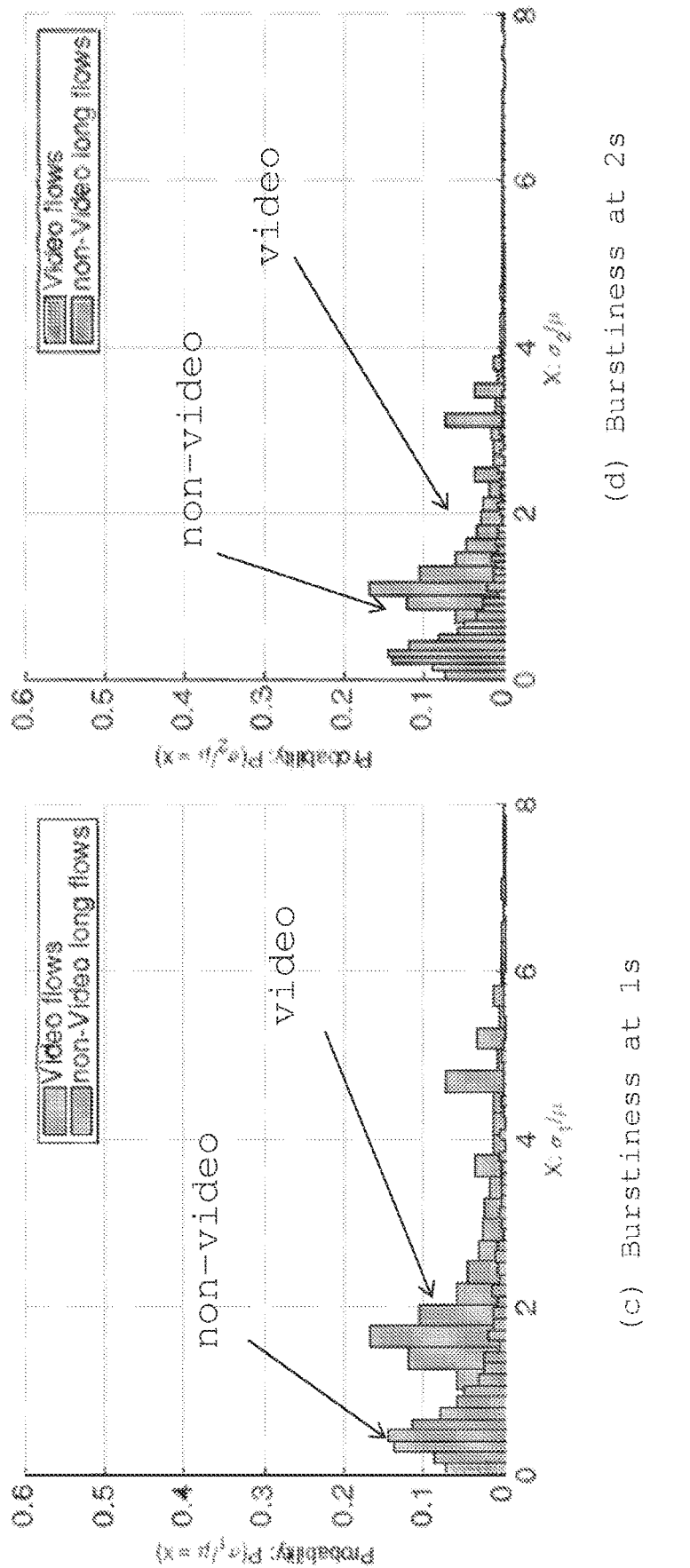
Figure 7:
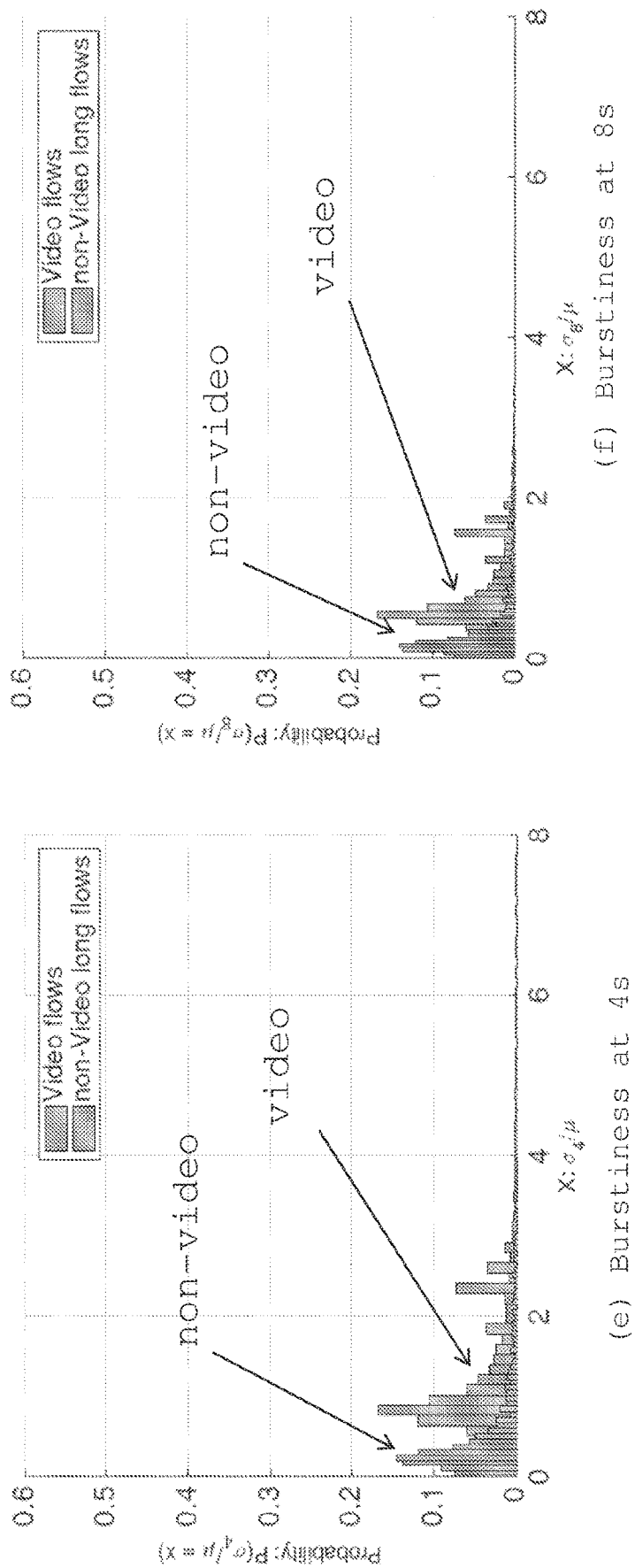

FIG. 7 shows the resulting histograms of each attribute for the video identifier, and the differences are visually apparent. For example, the idle-time histogram in FIG. 7(a) shows that the idle-times of non-video flows are centered at about 1% with minor deviations, whereas the idle-times of video traffic flows are widely spread between 20% and 95%. The video and non-video streams are not very distinct in their histogram of average rate in FIG. 7(b). However, they are quite different in their burstiness behaviour at various time-scales, as seen in FIGS. 7(c)-7(g).

Figure 8:
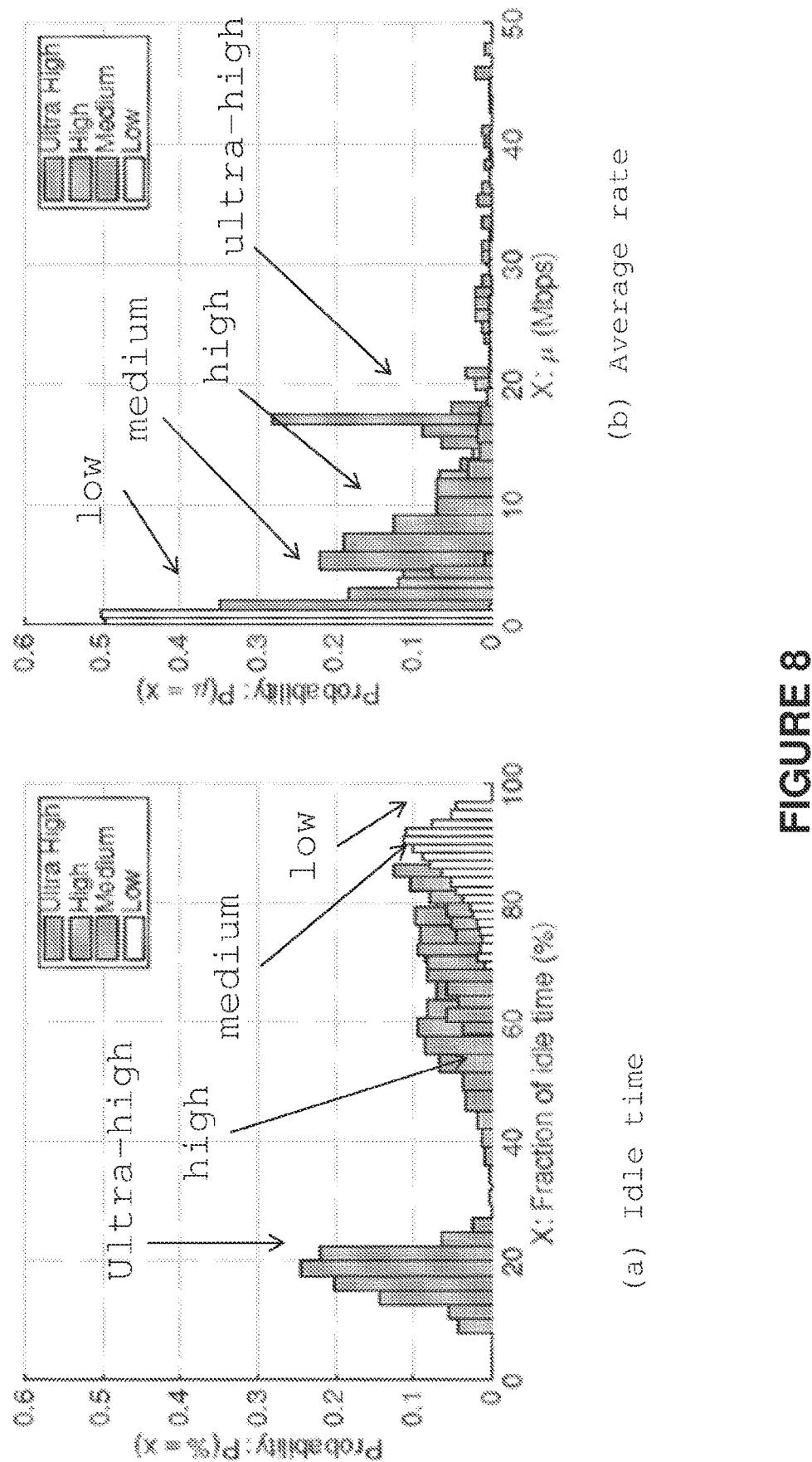
FIG. 8 shows histogram of idle-time, average rate and burstiness at various time scales for various resolutions of video streams.
Figure 8:
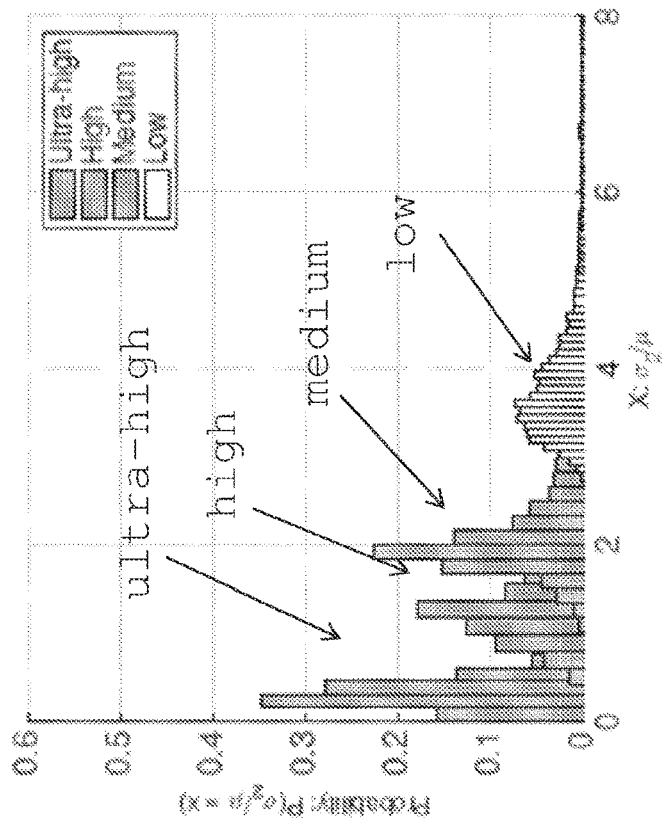
Figure 8:
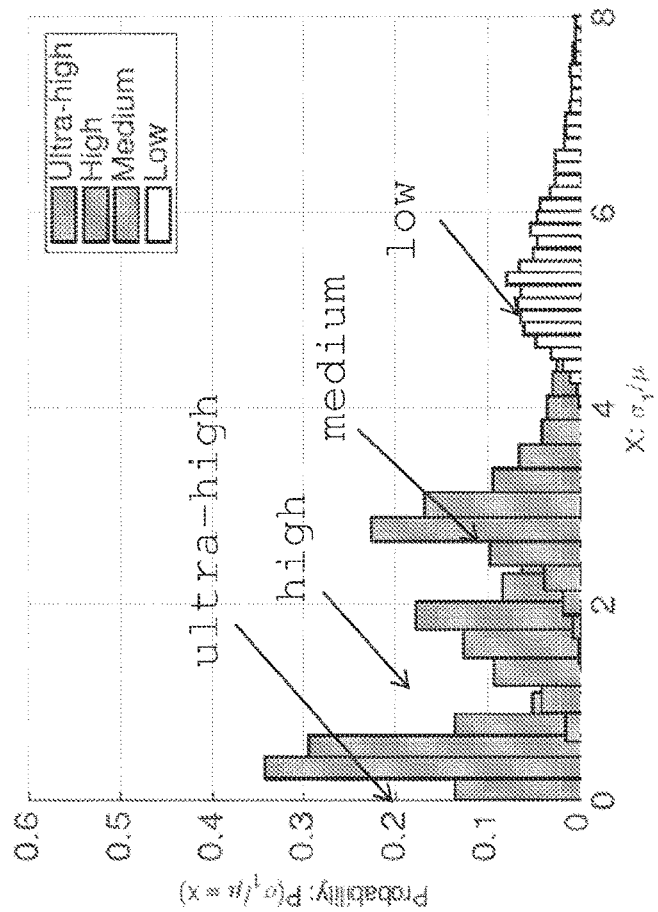
Figure 8:
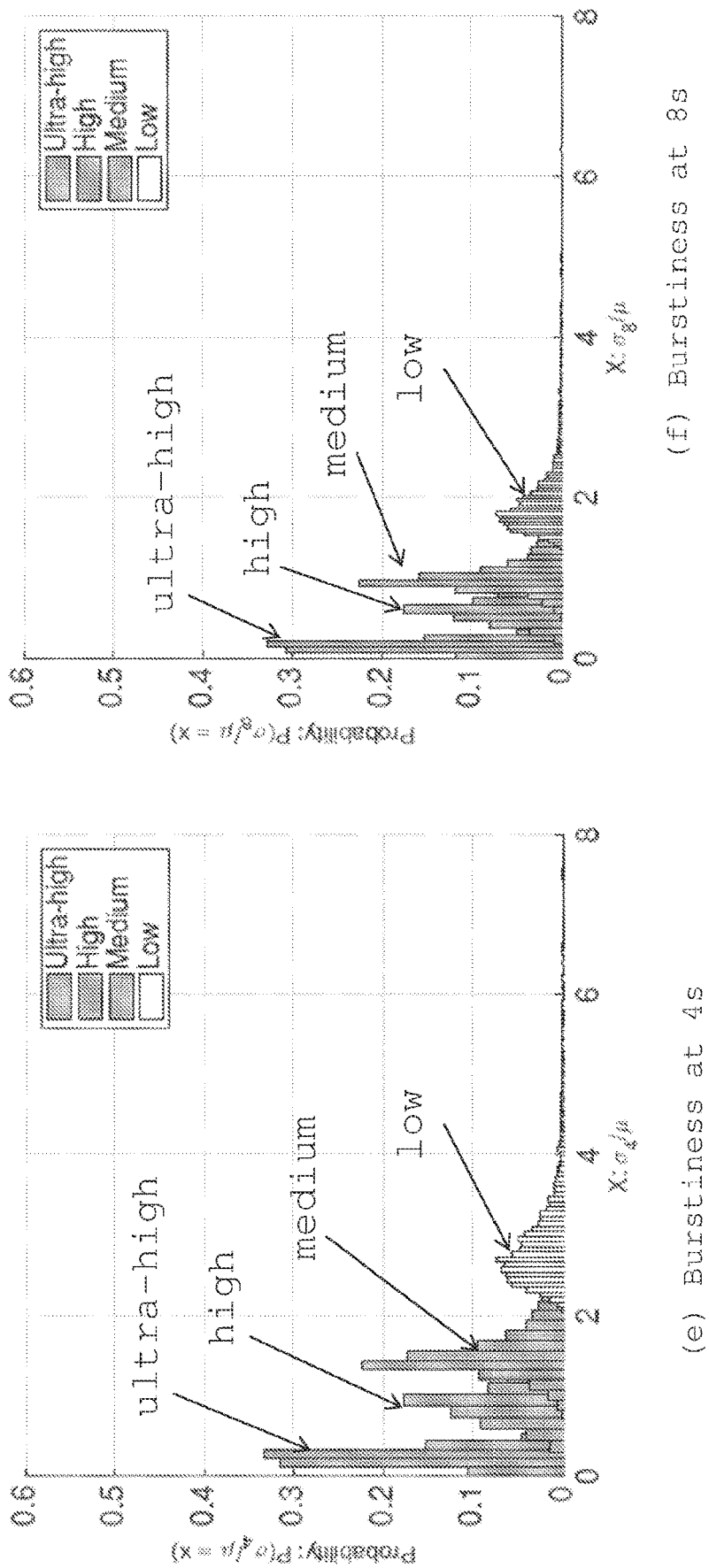
Figure 8:
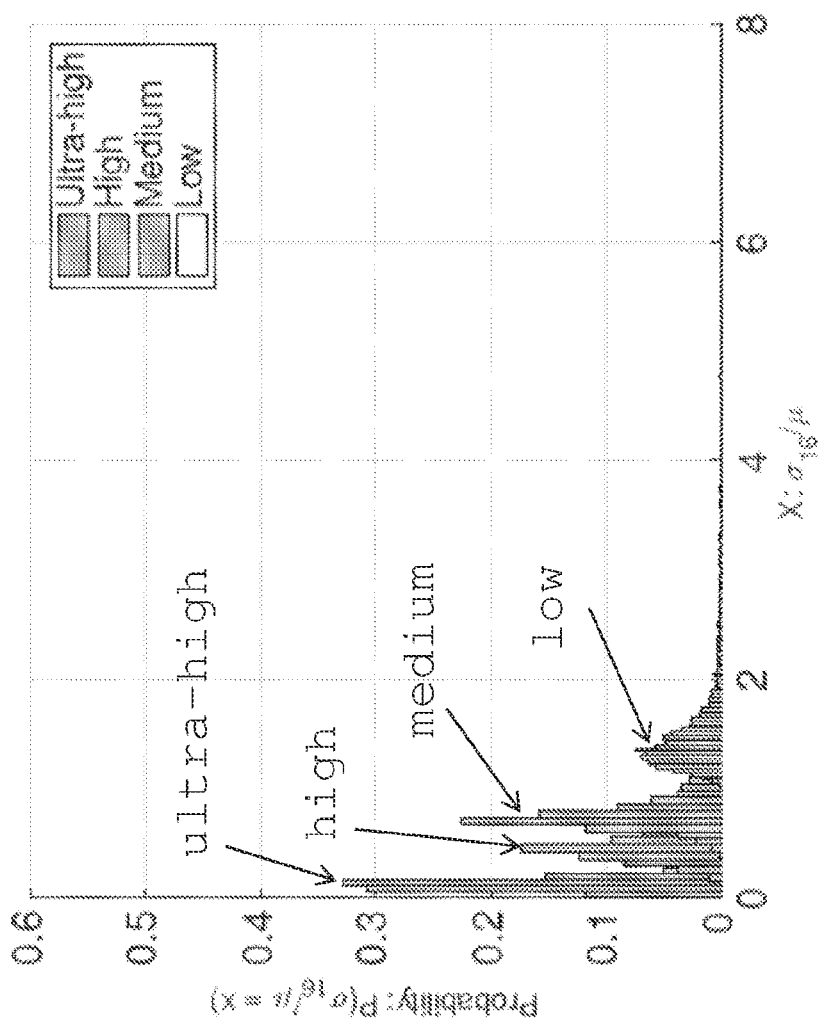

FIG. 8 shows the attribute distributions for the resolution classifier. As expected, as the resolution increases from low to ultra-high, the average rate distribution shifts to the right (FIG. 8(b)), while the idle-time fraction distribution shifts to the left (FIG. 8(a)). The burstiness at various time-scales also decreases, as shown in FIG. 8(g).

6.2.1 Cross Validation:

The Weka tool was used to train and validate the machine learning method for video identification and classification. Three popular classification algorithms were employed, namely J48, Random Forest, and MLP, that use the attributes described above. The efficacy of the classifiers was validated using the 10-fold cross-validation method.

Figure 9:
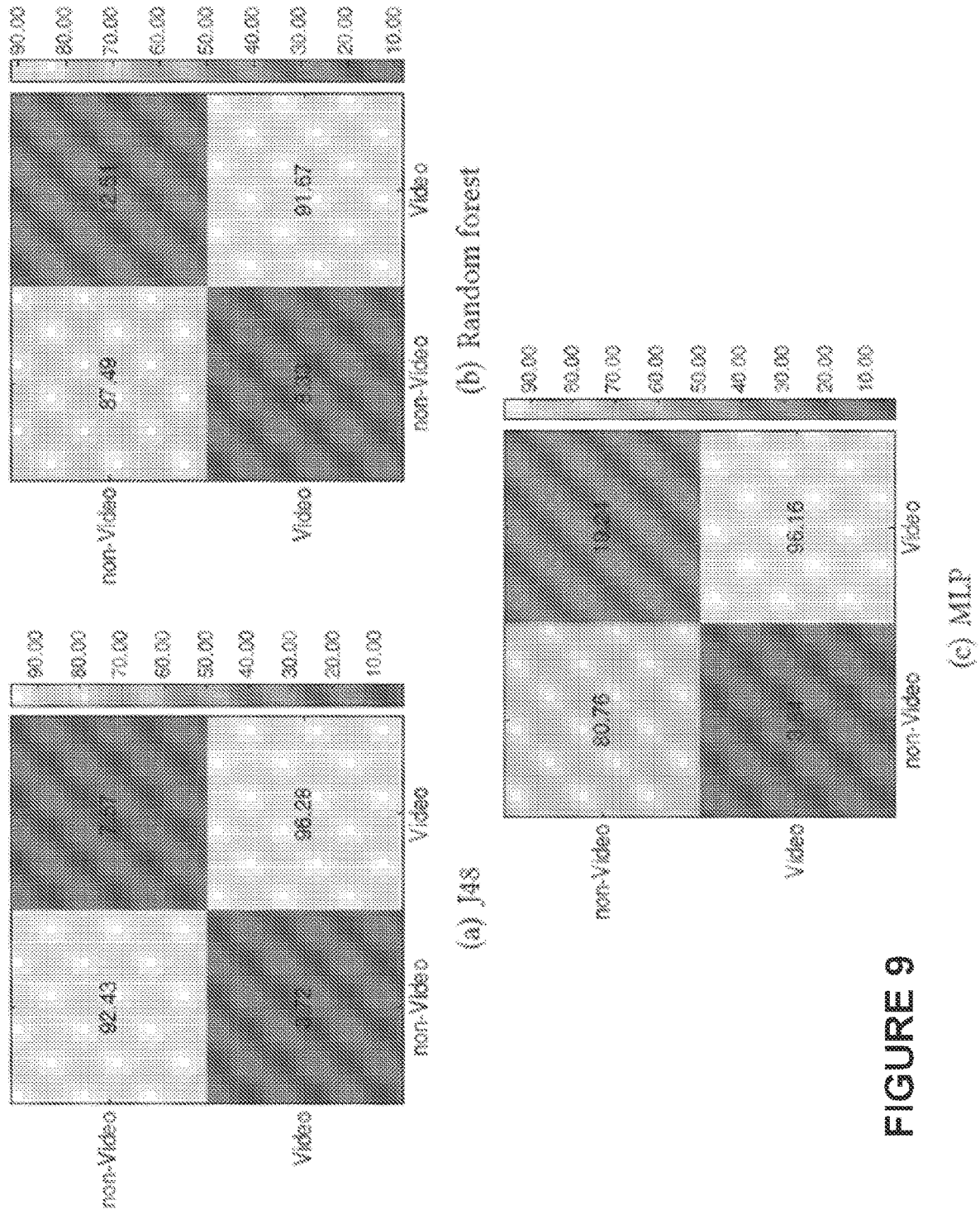
FIG. 9 shows a confusion matrix of a video identifier of the system.

The cross-validation method randomly splits the dataset into training (90% of total instances) and validation (10% of total instances) sets. This cross-validation is repeated 10 times. The results are then averaged to produce a single performance metric. The accuracy of the video identifier is shown in the form of a confusion matrix in FIG. 9. Over 96% of video streams are correctly identified using the J48 and MLP algorithms, while the random forest has a slightly worse performance. The correct identification of non-video flows is over 92% with J48, though Random forest and MLP perform worse. Overall, the J48 gives reasonable performance, with false positives (non-video being classified as video) below 8% and false negatives (video being classified as non-video) below 4%.

Figure 10:
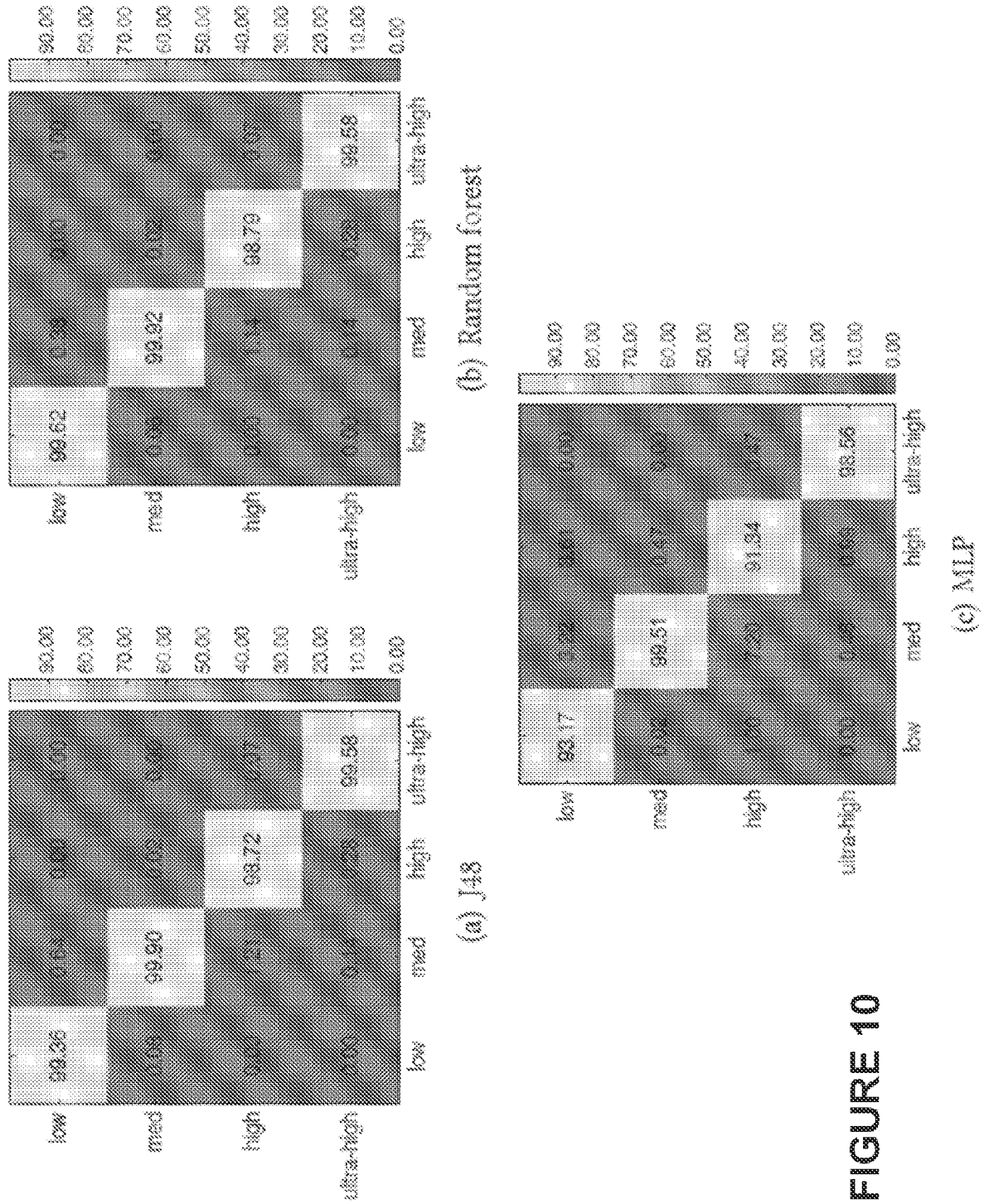
FIG. 10 shows a confusion matrix of a video resolution classifier of the system.

Confusion matrices for the resolution classifier are shown in FIG. 10. Both J48 and Random forest yield a consistent overall accuracy of over 98%. It is seen that high definition videos are wrongly classified more often than other resolutions, and are more likely to be mis-classified as medium resolution. Unsurprisingly, mis-classified low resolution videos are also more likely to be labelled as medium resolution. The geometry of the training instances is more suitable for decision-tree-based classifiers (i.e. J48 and Random forest) than neural-network-based classifiers (i.e. MLP), resulting in better accuracy. Furthermore, all of the chosen attributes have significant contributions in identifying/classifying video traffic. and since J48 uses one decision tree for all training instances, it outperforms Random forest which employs a collection of independent decision trees, each considering a random subset of training instances.

Weka was used to evaluate the average merit of each attribute in the classification process. FIG. 11(a) shows that the idle-time and the burstiness at 2-second and 4-second ($\sigma 2/\mu$ and $\sigma 4/\mu$) are the most important attributes to identify a video stream (shown by blow bars). However, average rate ($\mu$) and idle-time contribute more to the resolution classifier.

The accuracy of machine learning was evaluated using a combination of instances from various sub-profiles (from the first 16 seconds to past one minute over a two-minute lifespan). The performance of the classifiers for each sub-profile was studied separately. FIG. 11(b) suggests that video streams are identified with an accuracy of about 60% if only the first 16 seconds of their profile is available to the classifier. It is seen that the growth in the length of sub-profiles enhances the accuracy significantly—after 48 seconds, 90% accuracy is achieved. Similarly, the accuracy of the resolution classifier is highly correlated with the length of sub-profile, as shown in FIG. 11(c). This is not surprising, as various attributes computed during the first 16 seconds do not perfectly identify/classify video flows due to their initial buffering. For example, an ultra-high resolution video (FIG. 3(d)) is very similar to a large download if the idle-time, average rate and burstiness are considered for only the initial 16 or 32 seconds of the profile. The attributes $\sigma 8/\mu$ and $\sigma 16/\mu$ become available respectively only after 32 and 64 seconds of stream activity, and are fairly important for the classification.

Figure 11:
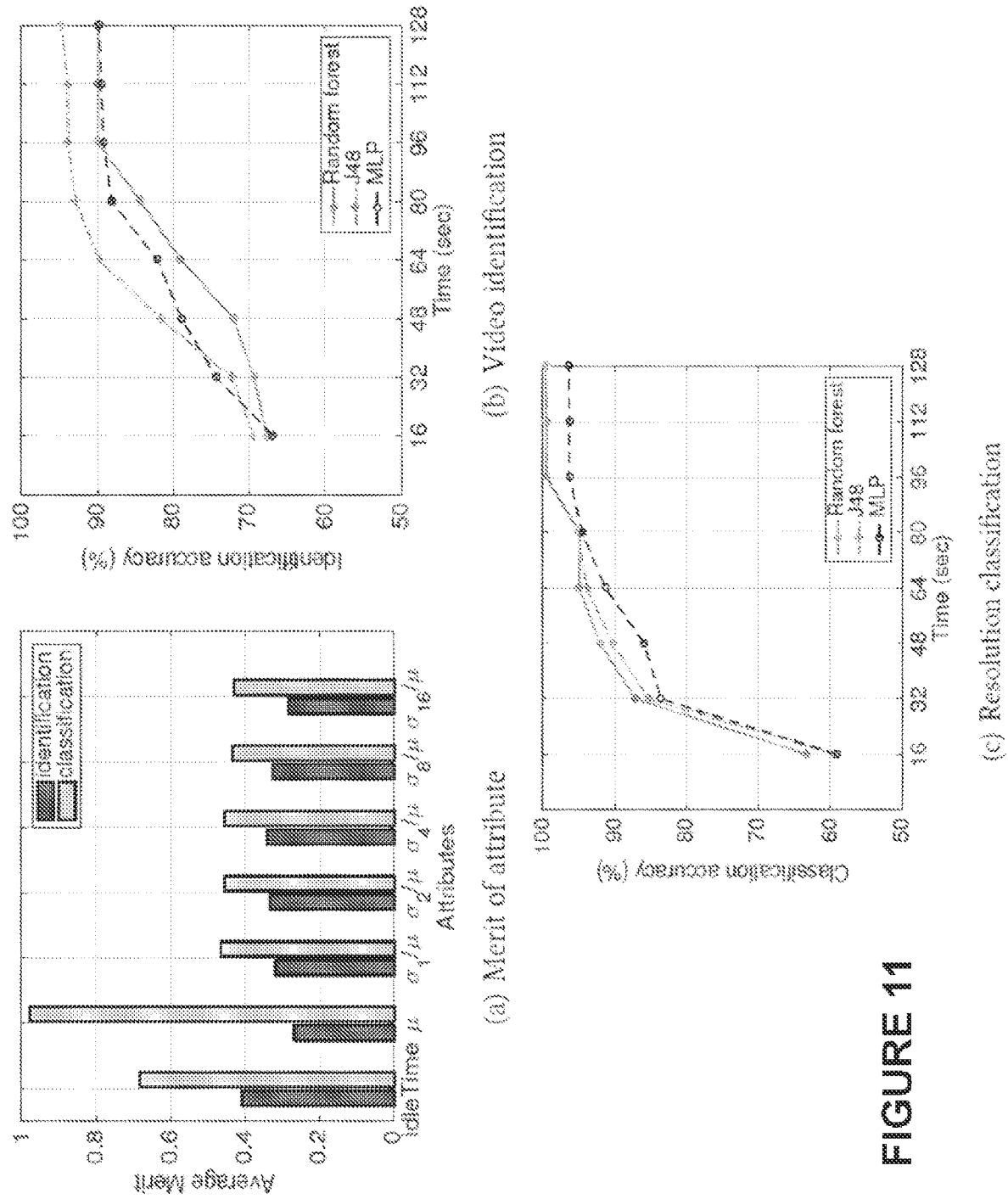
FIG. 11 shows the performance accuracy of the system.
Figure 12:
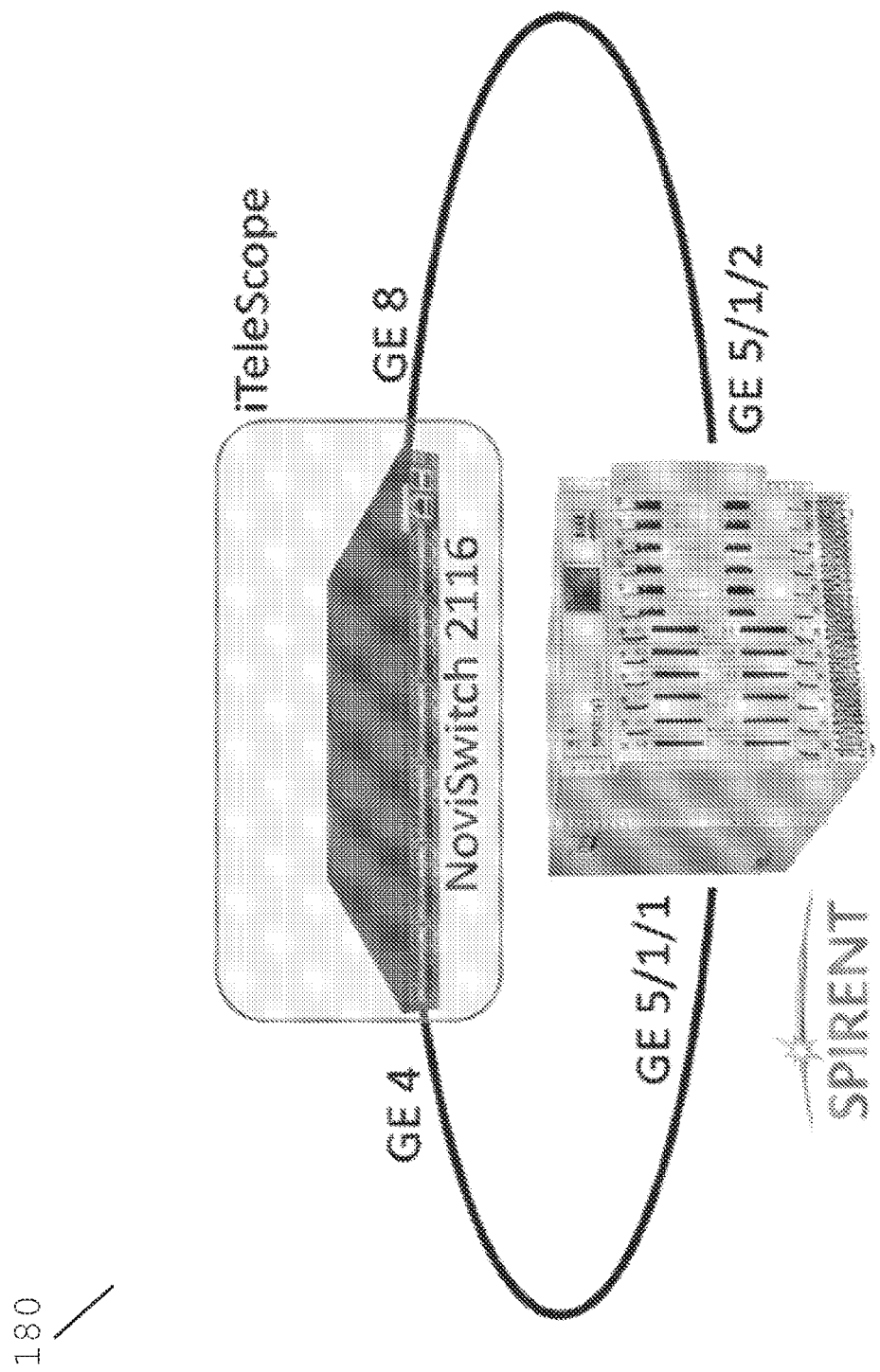
FIG. 12 shows a set-up used for performance evaluation of the system.
Figure 13:
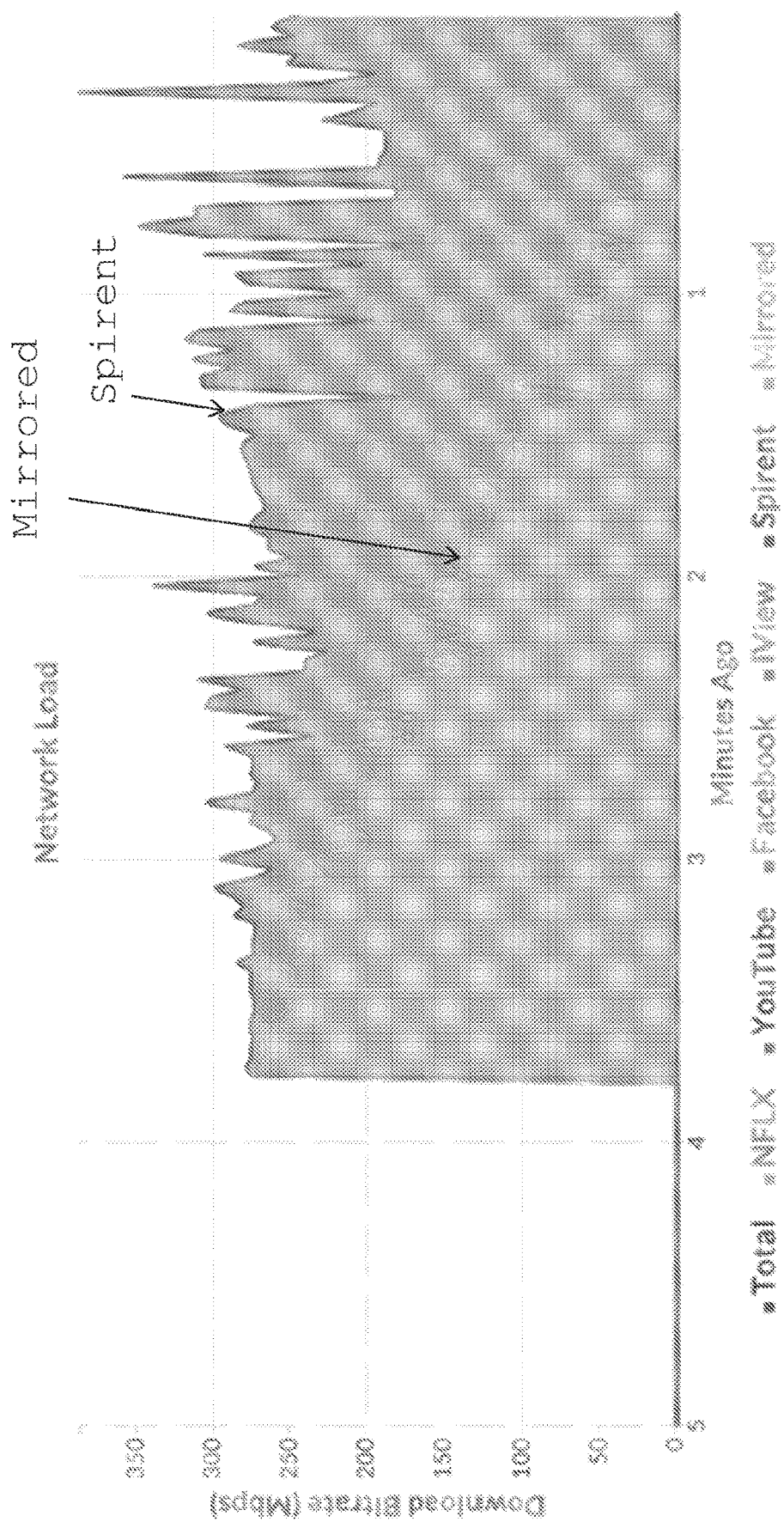
FIG. 13 shows network load for various content providers at one second intervals.

6.2.2 Summary:

Identifying video streams and their resolutions for elephant flows based on their flow-level (rather than packet-level) characteristics such as idle-time, average-rate, and burstiness at multiple time-scales is feasible in real-time. FIG. 11 confirms that the apparatus 40 can correctly identify video flows with about 70% accuracy within the first 30 seconds, rising to over 95% accuracy in two minutes. Similarly, resolution classification achieves over 80% accuracy in 30 seconds, rising to over 99% in two minutes.

7 Evaluation Results 7.1 Scalability Test

In this section, the efficacy of the system is disclosed by stressing it with a large number of emulated flows using a Telescope shows (by purple line) an average load around 274.90 Mbps within a second, which is very close to the rate of 279.56 Mbps reported by the Spirent statistics (i.e. an error of less than 1.7%). It is noted that the throughput of mirrored traffic (shown by yellow line) peaks at 273.45 Mbps and falls to zero gradually in 210 seconds.

This is not surprising, because the approach adopted in the present system only needs the initial few seconds worth of traffic from each new video flow to be sent to the traffic analyser for inspection; thereafter, a reactive flow entry is inserted to stop the packet mirroring. The mirror load is directly impacted by the rate of arrival of new video streams. Upon insertion of the reactive flow, no packet from that stream is mirrored, and our application thereafter polls byte-counts to monitor stream activity.

Figure 14:
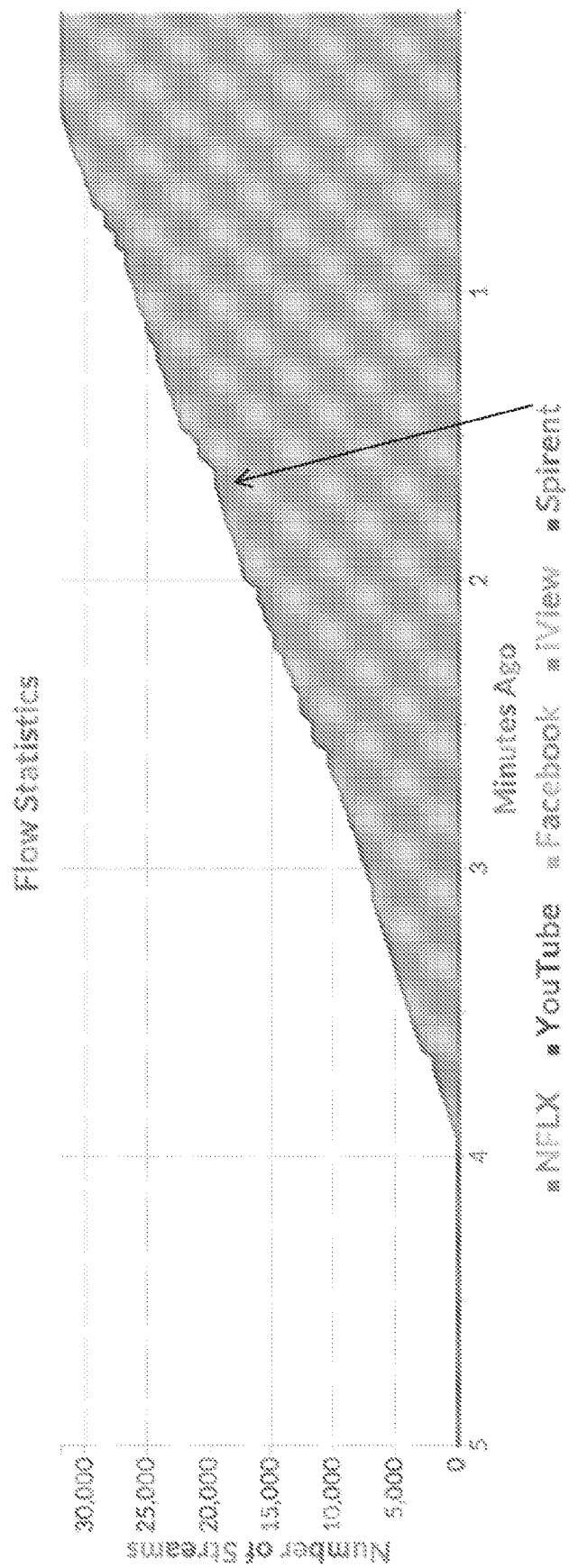
FIG. 14 shows flow statistics indicating the detection of elephant flows by the system.

The Spirent statistics revealed that 10.48 GB of data were transferred, corroborating closely with the 10.44 GB measured by our system application. Of this, 4.35 GB was mirrored to the large flow detector 24, corresponding to about 42% of overall traffic. FIG. 14 shows the detection of elephant flows by our system, and corresponding reactive flow entries are pushed at the rate of 152 flows-per-second, resulting in almost zero packets being sent to the software large flow detector about 4 minutes into the experiment. The stress-test was meant to validate our system scalability to large number of active flows (31920) and high rate of new flows (280/second), ensuring that both the software large flow detector 24 and the Openflow switch 23 can keep up. The deployments described next were found to have much lower requirements in terms of active flow numbers and new flow arrivals, even though the absolute data rates were higher.

7.2 Campus Dorm Traffic Classification

The apparatus 40 was also tested for several months in the university dorm wired network serving hundreds of students.

Figure 15:
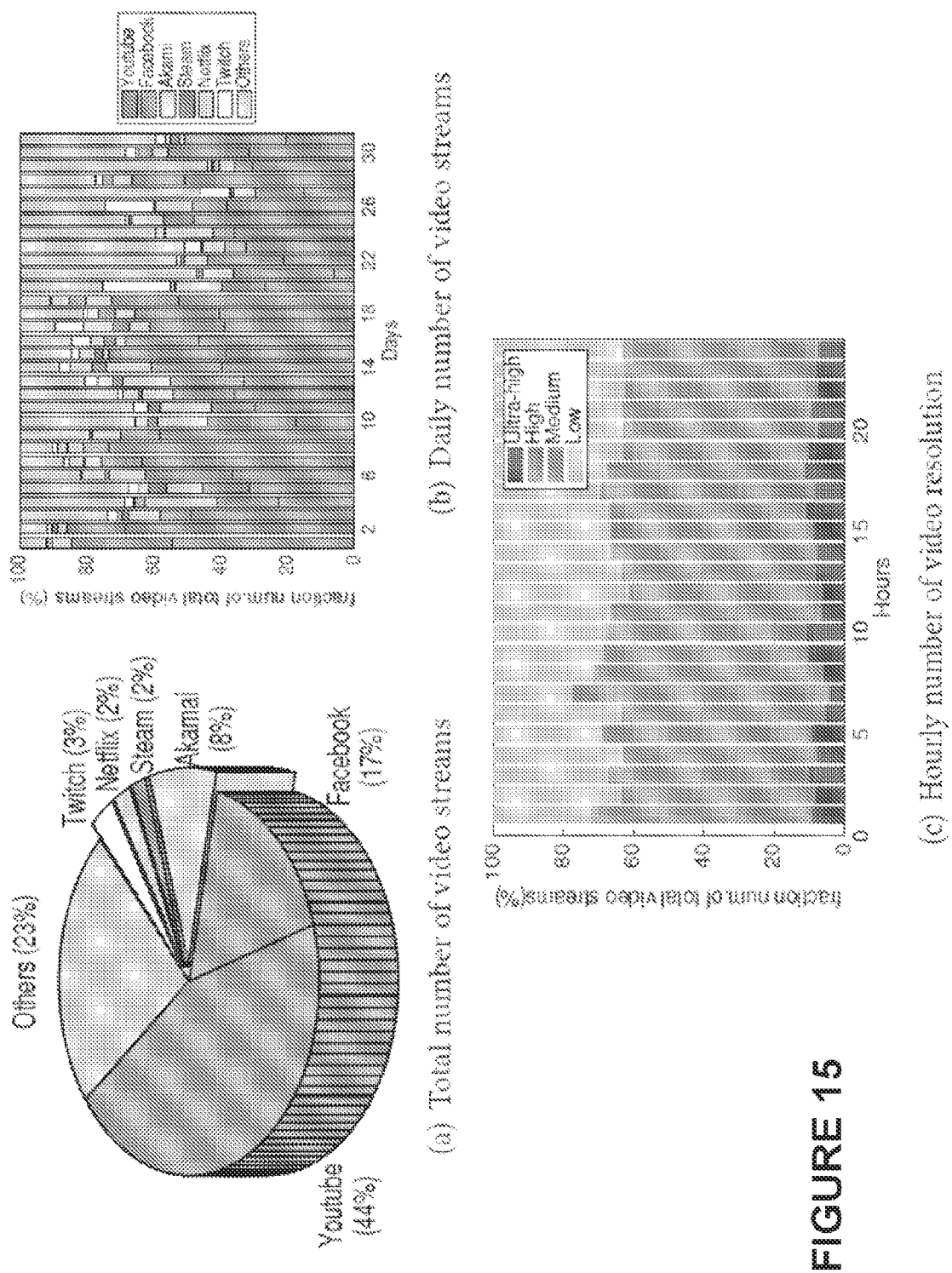
FIG. 15 shows distribution of Dorm Video Consumption (for the month of May 2017), showing (a) a pie chart of the fraction of total streams from popular video providers, (b) a bar chart showing daily number of video streams, and (c) a bar chart of hourly number of video resolution.

The following discussion provides insights regarding video viewing patterns in the dorm, pertaining to the month from 1 May 2017 to 31 May 2017. FIG. 15(a) shows a pie chart of the fraction of streams from the most popular video content providers—it is not unexpected that free video content providers (Youtube and Facebook) are the most dominant, at 44% and 17% respectively. Interestingly, the number of video streams from the gamer platform Twitch (3%) exceeds the number of Netflix streams (2%). It is noted that 8% of video flows are sourced from Akamai media servers (i.e. akamai.net and akamaiedge.net). Lastly, the system allowed identification of many other cloud video providers such as Tencent, Youku, Amazon, Fastly, Alibaba, Shifen—these are grouped as "Others" in FIG. 15(a) that collectively contribute to 23% of video streams in the dorm.

Figure 16:
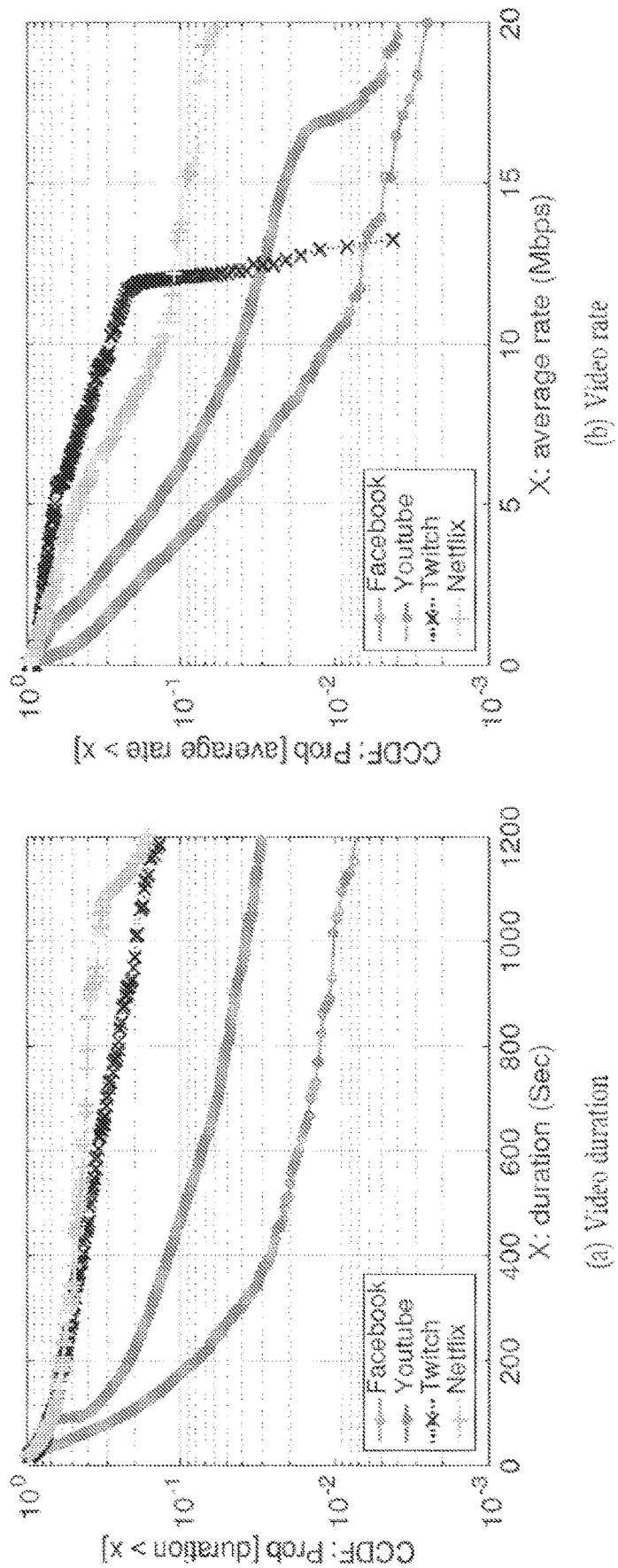
FIG. 16 shows CCDF of Dorm Video characteristics.
Figure 17:
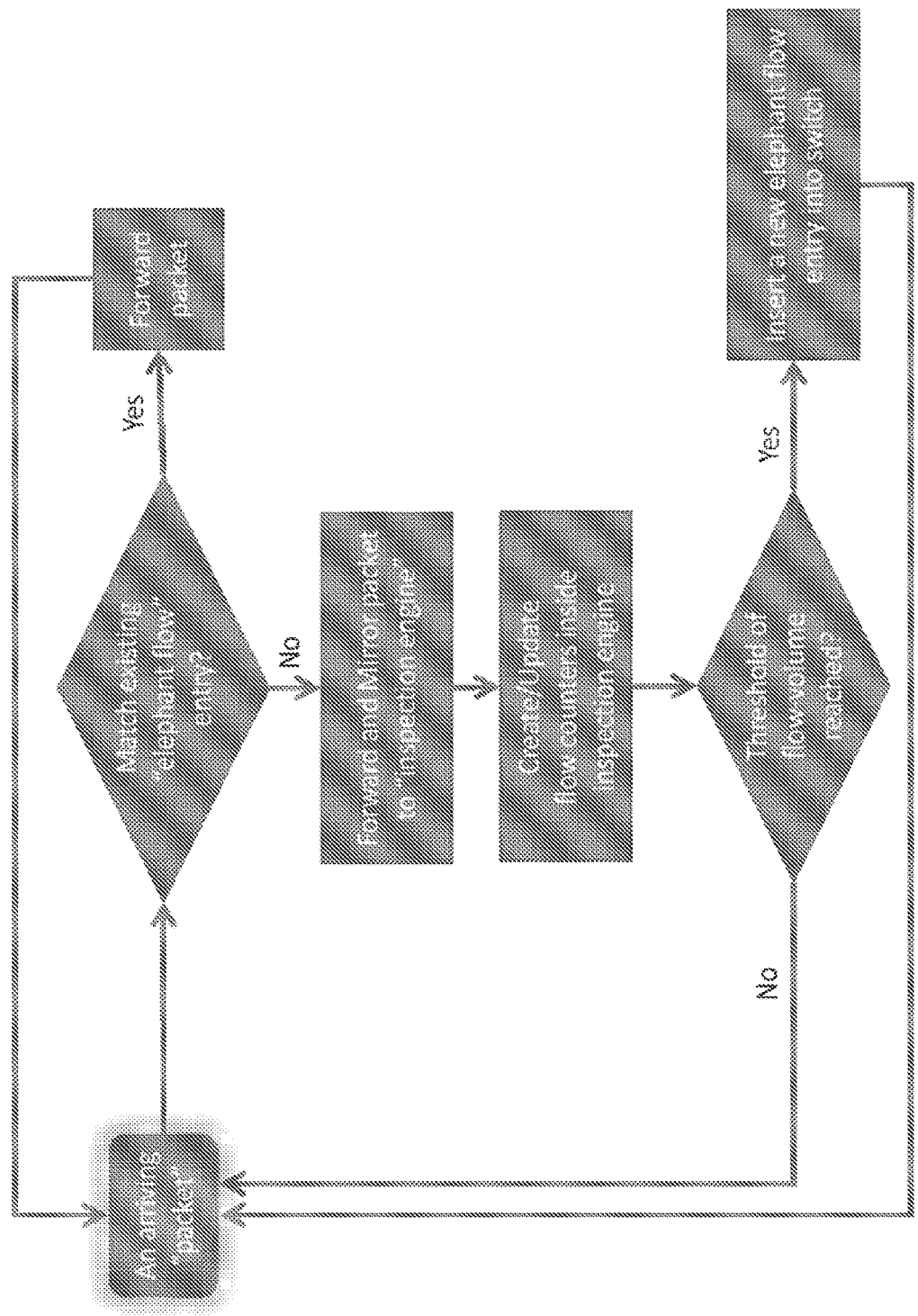
FIG. 17 is a flow diagram of a large flow detection process of the system.
Figure 18:
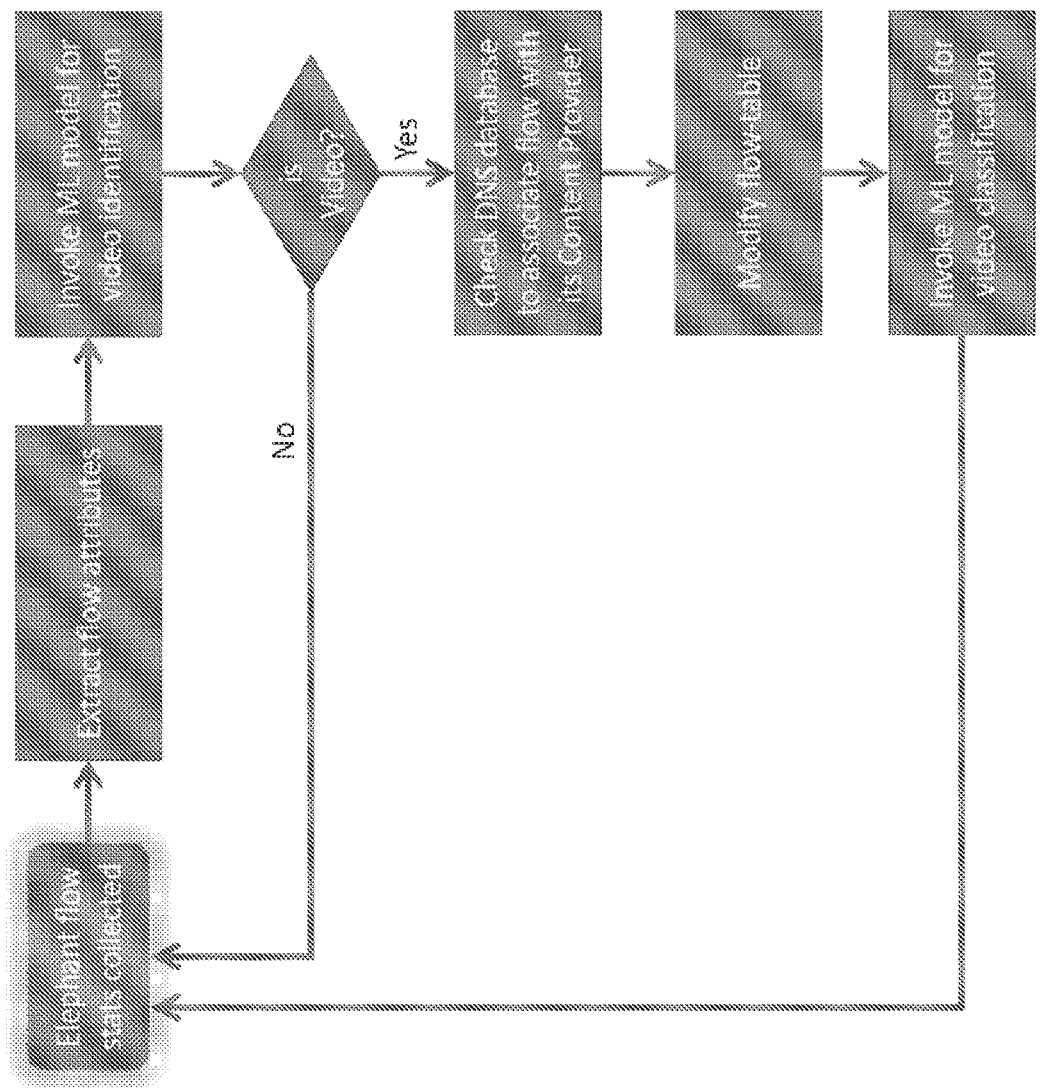
FIG. 18 is a flow diagram of a video classification process of the system.

FIG. 16 depicts the complementary cumulative distribution function (CCDF) of the duration and average-rate of video streams from 4 popular content providers including Facebook™, Youtube™, Twitch™ and Netflix™, during May 2017. As shown in FIG. 16(a), Twitch and Netflix videos are played for longer durations (with an average duration of about 10 minutes), followed by Youtube and Facebook videos with average durations of about 3.5 and 1.5 minutes respectively in the dorm. Considering the average-rate in FIG. 16(b), Twitch and Netflix videos normally consume more bandwidth than Youtube and Facebook videos—Twitch and Netflix use on average 6.6 Mbps, while this measure is 2.8 and 1.5 Mbps for Youtube and Facebook, respectively.

In FIG. 15(b) the day-by-day video consumption pattern over the month is shown. Interesting observations that emerge from this are that there is a substantial fluctuation in the relative proportion of video providers from day to day, and it would seem that the dorm residents tended to watch Twitch gaming videos more on weekends than on weekdays. FIG. 15(c) shows the fraction of video streams at different resolutions on an hourly basis (averaged over the month of May 2017). Surprisingly, a majority of videos are playing at medium resolution and only a small fraction of videos are at ultra-high resolution, despite the university campus network having abundant bandwidth and rarely experiencing congestion. This is because most free movies (or long video clips) are only available at medium resolution or less (i.e. 144p, 240p, 360p, 480p and 720p) on Youtube and Facebook.

Nevertheless, the number of video streams by hour, along with the distribution of their quality, gives visibility into video streaming in the University dorm network that was not feasible before, and is much appreciated by the university IT staff who can obtain weekly and monthly reports directly from the apparatus 40.

The described embodiments of the present invention judiciously combine software packet-level inspection with hardware flow-level telemetry, together with machine learning, to identify and classify video flows in real-time and at low-cost.

The above embodiments and examples have been described in the context of applications for identifying and classifying video data flowing through a network. However, it should be understood that the invention is not limited to monitoring video data and can be used to monitor other types of network data.

Many modifications will be apparent to those skilled in the art without departing from the scope of the present invention.

The invention claimed is:

1. A network traffic monitoring process executed by a network traffic monitoring component of a communications network, the process including:
   receiving data packets from a software-defined networking (SDN) flow switch of a communications network;
   processing header fields of the received data packets to identify subsets of the data packets as belonging to respective network flows;
   detecting large network flows by determining, for each of the network flows, a corresponding cumulative amount of data contained in the received packets for the network flow until the cumulative amount of data reaches or exceeds a predetermined threshold amount of data;
   for each detected large network flow, sending flow identification data to the SDN flow switch to allow the SDN flow switch to identify further packets of the large network flow as being packets of the large network flow and to stop sending the further packets of the large network flow to the network traffic monitoring component;
   for each large network flow, periodically receiving from the SDN flow switch corresponding counter data representing amounts of data contained in packets of the large flow forwarded by the SDN switch;
   for each large network flow, processing the corresponding counter data and corresponding timestamp data to generate temporal metrics of the large network flow; and
   for each large network flow, processing the generated temporal metrics with a trained classifier to classify the large network flow as being one of a plurality of predetermined flow types.

2. The process of claim 1, wherein the flow types include video flows and non- video flows.

3. The process of claim 2, wherein the flow types include video flows of respective different resolutions.

4. The process of claim 1, including determining service providers of at least some of the large network flows from DNS information.

5. The process of claim 1, wherein the flow metrics include idle time, average rate, and metrics of burstiness.

6. The process of claim 1, wherein the flow metrics include metrics of burstiness at respective time scales.

7. The process of claim 6, wherein the time scales represent a geometric series.

8. At least one non-transitory computer-readable storage medium having stored thereon executable instructions that, when executed by one or more processors, cause the one or more processors to execute the process of claim 1.

9. The process of claim 1, wherein the flow metrics include idle time, average rate, and metrics of burstiness.

10. A network traffic monitoring process executed by a software-defined networking (SDN) flow switch of a communications network, the process including the steps of:
   receiving a data packet from the communications network;
   processing the received data packet to determine whether the data packet is a packet of a plurality of predetermined large network flows, and if so, to identify a corresponding one of the predetermined large network flows;
   if said processing identifies a corresponding predetermined large network flow of the data packet, then updating corresponding counter data representing a corresponding amount of data of the large network flow;
   otherwise, if the data packet is not determined to be a packet of the plurality of predetermined large network flows, then forwarding the data packet to a component of a network traffic monitoring system to determine whether the data packet is a packet of a large network flow that is not one of the predetermined large network flows;
   receiving large flow identification data from a component of the network traffic monitoring system, the large flow identification data identifying at least one further large network flow that is not one of the predetermined network flows;
   processing the received large flow identification data to add the at least one further large network flow to the predetermined large network flows so that the processing step will determine that further data packets of the at least one further large network flow are packets of the at least one further large network flow and consequently the SDN flow switch will not forward the data packet to the component of the network traffic monitoring system; and
   periodically sending, to a component of the network traffic monitoring system, counter data representing amounts of data contained in respective ones of the predetermined large network flows.

* * * * *